(12) United States Patent
Afeyan et al.

(10) Patent No.: US 7,177,851 B2
(45) Date of Patent: Feb. 13, 2007

(54) METHOD AND APPARATUS FOR DYNAMIC, REAL-TIME MARKET SEGMENTATION

(75) Inventors: Noubar B. Afeyan, Lexington, MA (US); Kamal M. Malek, Weston, MA (US); Nigel J. Bufton, Oxfordshire (GB); Sevan G. Ficici, Cambridge, MA (US); Howard A. Austin, deceased, late of Alexandria, VA (US); by Larry J. Austin, legal representative, Alexandria, VA (US); by Honor E. McClellan, legal representative, Waban, MA (US)

(73) Assignee: Affinnova, Inc., Cambridge, MA (US)

( * ) Notice: Subject to any disclaimer, the term of this patent is extended or adjusted under 35 U.S.C. 154(b) by 533 days.

(21) Appl. No.: 10/053,353

(22) Filed: Nov. 9, 2001

(65) Prior Publication Data

US 2003/0088458 A1 May 8, 2003

Related U.S. Application Data

(60) Provisional application No. 60/247,271, filed on Nov. 10, 2000.

(51) Int. Cl.
*G06N 5/00* (2006.01)
(52) U.S. Cl. .............................. 706/13; 706/45; 705/10
(58) Field of Classification Search ................ 345/467; 382/203; 434/43; 709/223; 706/13, 45; 705/10, 14, 925
See application file for complete search history.

(56) References Cited

U.S. PATENT DOCUMENTS

| | | | |
|---|---|---|---|
| 4,115,761 A * | 9/1978 | Ueda et al. ............... 382/203 |
| 4,935,877 A | 6/1990 | Koza ........................... 706/13 |
| 5,041,972 A | 8/1991 | Frost .......................... 364/401 |
| 5,090,909 A * | 2/1992 | Keller et al. ................. 434/43 |
| 5,124,911 A | 6/1992 | Sack .......................... 364/401 |
| 5,222,192 A | 6/1993 | Shaefer ....................... 395/13 |
| 5,255,345 A | 10/1993 | Shaefer ....................... 395/13 |
| 5,375,195 A | 12/1994 | Johnston ..................... 395/135 |
| 5,400,248 A | 3/1995 | Chisholm .................... 364/409 |
| 5,559,729 A | 9/1996 | Abe ............................ 364/578 |
| 5,608,424 A * | 3/1997 | Takahashi et al. .......... 345/467 |

(Continued)

FOREIGN PATENT DOCUMENTS

WO    WO 00/02138    1/2000

OTHER PUBLICATIONS

Sims, "Artificial Evolution for Computer Graphics," *Computer Graphics*, 25(4):319-328 (Jul. 1991).

(Continued)

*Primary Examiner*—Wilbert Starks
(74) *Attorney, Agent, or Firm*—Edwards Angell Palmer & Dodge LLP

(57) ABSTRACT

The invention involves generating and presenting, typically electronically, a number of design alternatives to persons who are participating in the design, selection, or market research exercise. The participants (referred to as "selectors") transmit data indicative of their preferences among or between the presented design alternatives, and that data is used to derive a new generation of design alternatives or proposals. The new designs are generated through the use of a computer program exploiting a genetic or evolutionary computational technique. The process is repeated, typically for many iterations or cycles.

21 Claims, 21 Drawing Sheets

U.S. PATENT DOCUMENTS

| | | | | |
|---|---|---|---|---|
| 5,913,204 | A | | 6/1999 | Kelly .......................... 705/500 |
| 5,930,780 | A | | 7/1999 | Hughes et al. ................ 706/13 |
| 5,995,951 | A | | 11/1999 | Ferguson ..................... 706/10 |
| 6,029,139 | A | * | 2/2000 | Cunningham et al. ........ 705/10 |
| 6,078,740 | A | | 6/2000 | DeTreville ............. 395/500.43 |
| 6,088,510 | A | | 7/2000 | Sims ........................... 395/13 |
| 6,125,351 | A | | 9/2000 | Kauffman ..................... 705/7 |
| 6,167,445 | A | * | 12/2000 | Gai et al. ................... 709/223 |
| 6,934,748 | B1 | | 8/2005 | Louviere et al. |
| 2004/0123247 | A1 | | 6/2004 | Wachen et al. |

OTHER PUBLICATIONS

Kim et al., "Knowledge-based Encoding in Interactive Genetic Algorithm for a Fashion Design Aid System," Genetic and Evolutionary Computation Conference; Jul. 10-12, 2000, p. 757.

Garcia, "Computer Screen Design Aided by a Genetic Algorithm," in *Late Breaking Papers at the 2000 Genetic and Evolutionary Computation Conference*, Whitley, D. ed. (2000) pp. 98-101.

Balakrishnan et al., "Genetic Algorithms for Product Design," *Management Science*, 42(8):1105-1117 (Aug. 1996).

Graf et al., "Interactive Evolution of Images," *Evolutionary Programming IV—Proc. Fourth Annual Conf.—Evolutionary Programming*, MIT Press: Cambridge, Mass., 53-65 (1995).

Rowland, "Computer Graphic Control over Human Face and Head Appearance, Genetic Optimisation of Perceptual Characteristics," Ph.D. Thesis, University of St. Andrews, Scotland (Jan. 5, 1998).

Haupt et al., *Practical Genetic Algorithms*, 66-70 &85-88 (1998).

Kim et al., "Application of Interactive Genetic Algorithm to Fashion Design," Engineering Applications of Artificial Intelligence, (13):635-644 (2000).

O'Reilly et al., "A Preliminary Investigation of Evolution as a Form Design Strategy," in *Artificial Life VI*, MIT Press: Cambridge, Mass. (1998).

O'Reilly et al., "Evolution as a design strategy for nonlinear architecture: Generative modeling of 3-D surfaces," (1998).

Johnston, *Why We Feel: The Science of Human Emotions*, Perseus Books: Cambridge, Mass. 152-155 (1999).

Witbrock et al., "Evolving Genetic Art," *Evolutionary Design by Computers*, 251-259 (1999).

* cited by examiner

Affinnova - Registration affinnova

BECOME A MEMBER!
Create your FREE Affinnova account below

*Required fields

| | |
|---|---|
| *EMAIL Address: | [         ] 502 |
| *Password: | [     ] 504 |
| *Confirm Password: | [     ] |
| Gender: | [Male ▽] 510 |
| Age: | [30-34 ▽] 512 |
| *Country: | [Please choose country ▽] 514 |
| *ZIP Code (US Only): | 506 [   ]-[   ] |
| Household Income: | [Please choose income ▽] 516 |
| Send email to remind me to vote: | ☑ |
| Send email to update me on Affinnova: | ☑ 520 |
| Automatically log me in: | ☑ 524 |

[Update] 522

METHOD AND APPARATUS FOR DYNAMIC, REAL-TIME MARKET SEGMENTATION

CROSS-REFERENCE TO RELATED APPLICATIONS

This application claims the benefit of co-pending provisional patent application Ser. No. 60/247,271, filed Nov. 10, 2000.

BACKGROUND OF THE INVENTION

This invention relates to improvements in the process of developing new products and services, and the attendant activities of consumer research, market segmentation, design iteration and market testing, as well as the marketing of such products and services, through direct customer participation. The invention also relates to the process of collective decision making, which presents issues in many respect parallel to those encountered in the design and product development process.

Early in human history, the distinctions between the designer, the manufacturer, and the user of an artifact simply did not exist. People made their tools for their own use, and built their dwellings in an unselfconscious process passed across generations. Later, as the various arts and crafts evolved, the artisan or craftsman embodying both design and manufacturing functions remained close to his customers. The small volumes involved and the largely custom nature of craft production meant that the product responded directly to the needs and wants of individual customers. The industrial revolution brought an increase in the division and specialization of labor, along with the attendant economies of scale and scope. As a result, the design and production functions became distinct, production volumes increased, and products became more standardized. A particular product usually now had to satisfy a larger group of customers. That trend took a major leap with Ford's development of mass production.

Many products today require for their design large groups of people with highly specialized skills and knowledge, often numbering in the thousands, and often spread across continents. Furthermore, the development lead-time for some products can easily stretch to many years (e.g., new generation aircraft). The complexity of these products and services, and of the processes used to develop them, is reflected in the organizational structure of the companies which design and make them. Within the typical product development organization, the stakeholders in a given product development project include such diverse departments as product planning, styling, engineering, sales and marketing, manufacturing, after-sales service, legal affairs, and more recently, members of outside part supply companies. Each of these departments or organizations has its own objectives, constraints, and performance measures, and its executives and managers their own goals and idiosyncrasies. These and other factors have conspired to increase dramatically the distance between the people who design products and services, and the customers who consume them, whether the distance is measured in terms of geography, time, and technical knowledge, or in terms of worldview, goals, and daily concerns.

In the past, many product development organizations relied on a few powerful individuals in their design or marketing departments, or in their executive ranks. These individuals in turn relied on their knowledge of the market and the customer, on their understanding of the technological possibilities, and on their vision, judgment, experience, preferences, prejudices and biases. In recent years, as consumers have grown increasingly sophisticated and knowledgeable, and as markets have become increasingly fragmented, this job has become more difficult.

More recently, companies have adopted flatter, less hierarchical organizational models, with decision making responsibility pushed lower through the ranks, and they have embraced a new focus on the "voice of the customer." This movement was intended to remind them that they are mere proxies for the ultimate consumer of the goods or services being designed, and that the needs and desires of the customer should be the paramount input to that process.

The process of going from the voice of the customer to a product or service that reflects it remains fraught with errors and the potential for distortions. The first source of error is in ascertaining the wants and needs of the customer; the second is in the process of translating that input into a decision, product, artifact or service without coloring and distorting it. Practitioners have developed and used several tools and techniques intended to assess the needs of the customer and to translate these needs into a product concept and into engineering requirements. These higher-level tools include Concept Engineering, and the House of Quality and Quality Function Deployment. A critical aspect of these higher level tools and methodologies is that they not only bring the product development team or organization closer to the customer, but also play an important role in creating a consensus between the different functions in the product development team, and in bringing the different parts of the organization together to work toward a common goal. In other words, whenever conflicts arise between different parts of the organization, they are supposed to be resolved by going back to the voice of the customer. If honest differences in interpreting the voice arise, the solution would be to seek clarification from the customer. These tools represent significant improvements in the product design and development process, but remain cumbersome and difficult to use, as their protagonists point out, and they require significant commitments of time and effort on the part of their users.

The tools and instruments that traditionally have been deployed by market researchers range from the highly qualitative methods borrowed from ethnography, such as open-ended interviewing, participant observation, and focus groups, to the highly popular quantitative statistical methods such as survey research and conjoint analysis. Some of these tools and techniques suffer from several shortcomings, which are detailed below.

During the development of a new product or service, the design organization typically will undertake a number of market research studies. Early on during the project, these may be more qualitative in nature, intended to uncover latent needs, or to develop new ideas for products and services. Later, the research may be more focused, intended to obtain feedback from current or potential customers on certain features or attributes of the proposed product; these could rely on qualitative methods, a focus group for example, as well as quantitative ones, such as surveys or structured serial interviews. One problem with consumer clinics is that potential customers are typically shown, and asked to comment on, a limited number of alternatives. This is done in order to keep the cognitive demands on the participants at a reasonable level, as these clinics are generally limited to a period of less than two hours, including the time necessary for providing the participants with the background and contextual information necessary for properly assessing the designs presented to them. Another reason is that the designs shown to the participants are in the form of models or prototypes that are costly to produce. In the traditional consumer clinic, people are suddenly taken from the world of today and asked to comment on future designs that they had not previously seen and which have not had the time to sink in.

Furthermore, consumer clinics, in which new products are shown to participants who are asked to comment on them, assume that people have preexistent preferences that are well-developed and stable. They therefore assume that the attitude that the participants form upon seeing the new product are valid and reflect the attitudes they will have when (and if) the product goes on the market. Yet, it is well-known that in many cases, people's long-term disposition towards a product differs from their initial reaction. For example, it is not uncommon for a consumer to feel initially that the styling of an outgoing automobile model is more attractive than that of its newly introduced replacement, only to change his or her mind after a few weeks of seeing the newer one on the road. Conversely, it is not uncommon for people's assessment of the attractiveness of a new product to plummet after the novelty wears off. This phenomenon is probably a reflection of two countervailing human tendencies, the desire for novelty and variety seeking on the one hand, and the comfort of the familiar on the other. Due to their compressed format, Focus groups and consumer clinics are vulnerable to this phenomenon.

Another problem with clinics and focus groups has to do with the interpersonal dynamics that the situation entails. In general, group dynamics are desirable in the sense that the discussion that takes place between participants is the mechanism for generating data, and the desired output is the active sharing and comparison of the participants' experiences and opinions. Problems arise when one or a few strong individuals end up dominating and biasing the discussion. Another difficulty is finding participants who do not know one another. This is desirable in order to avoid having one participant choose a particular design simply because his or her friend also chose it. This situation arises often when the product or service being designed is targeted at a small group of users, or users who are all members of the same group, for example, designing a benefits package for the employees of one company. Similar problems arise when the potential customers for a product happen to be competitors, and therefore less willing to sit together and share their preferences.

The interpersonal dynamics in the traditional focus group or consumer clinic are magnified when the designs being presented are radically novel or unusual. In such cases, many participants find it difficult to express their true opinions in front of the group. They find it safer to retreat to the safety of negative criticism. They tend to focus on what they find wrong with the design, instead of looking at the whole design and its potential benefits. Furthermore, it is well known that in the case of many products and services, consumer preferences vary geographically or ethnically. Southern California is considered to lead the rest of the country in automotive trends. Color preferences in the USA are different than those in France or China. For that reason, companies will generally hold consumer clinics in several different markets, each of which would be considered representative of a particular geographical area. This adds to the cost of using that format for eliciting consumer preferences.

Conjoint Analysis is used to assess consumer preference for different choices of products and services. It is a multi-attribute utility or preference measurement technique that explicitly accounts for the subjective tradeoffs people make when deciding among alternatives with multiple features and benefits. In its basic form, Conjoint Analysis is a decompositional technique: the parameters that measure the importance the decision maker ascribes to the different aspects of the product are derived, using statistical regression techniques, from the decision maker's evaluations of a number of full profile descriptions of the product or service. Conjoint Analysis has been used in a wide range of applications, from developing soaps and dietary supplements to improving the appeal of military careers within the Department of Defense.

The first step in conducting a Conjoint exercise is to identify the relevant attributes of the product or service in question, and to identify the levels of interest for each attribute. This is typically based on previous experience with similar products, and on earlier qualitative research such as an open-ended interview or a focus group. As an example, in the case of an automobile study, engine displacement may be one attribute of interest, with 2.0, 2.5, and 3.0 liters the three levels to be tested; and body style may be another attribute, with "sedan" and "coupe" as the levels of interest. Next, a number of full-profile descriptions of potential products, that is, descriptions in which every attribute is represented by a value, usually using a highly fractionated factorial orthogonal design (i.e., only a small fraction of all possible product profiles are used in the test.) These profiles are shown to the respondent, traditionally in the form of prop cards, and the respondent is asked to rank them by order of preference or to rate each of them on an interval scale, for example, from 0–100. The responses then are analyzed using statistical tools such as Ordinary Least Squares regression to estimate the "part-worths" for each of the attribute levels, that is, the contribution of each attribute level to the overall preference level of a profile. Returning to the earlier example, it might turn out that for one particular respondent, a 2.0 liter engine has a part-worth of 0.0, the 2.5 liter a part-worth of 0.5, and so on; the "sedan" body style may have a part worth of 0.0, whereas the "coupe" style may have a value of 0.8. Once the part-worths for an individual are obtained in this way, it is then possible to search through all the possible combinations of attribute levels to synthesize the optimal product for that individual, that is, the product that would give him or her the highest possible level of utility, or that he or she would have the strongest intention of buying.

Conjoint Analysis studies typically are conducted with more than one individual, and part-worths are typically obtained for a representative sample of consumers. This multi-respondent data can be used for several purposes. One is to identify the product design that would result in the greatest market share for the product development organization, given the attributes of competing products on the market (current and expected; this is known as the "share-of-choices" problem. Another purpose is to identify the product design that would maximize overall consumer utility, that is, the sum of utilities across all the consumers; this is known as the "buyer's welfare" problem. Solving these search problems is a hard computationally; mathematically, these are known as NP-Hard problems, requiring heuristic dynamic programming procedures for their solution. More recently, the adaptive search techniques of Genetic and Evolutionary Computation, more specifically Genetic Algorithms (GAs), have been used more effectively to find solutions to these problems. In that case, Conjoint Analysis data collected previously, using standard Conjoint Analysis techniques; in a separate and subsequent step, that data was subjected to the aforementioned search technique to find the optimal solutions or designs.

Another purpose of collecting Conjoint data from a representative group of participants is to identify distinct market segments with different preference profiles. This is done through cluster analysis, a statistical technique for finding subgroups of respondents such that respondents within a subgroup value the different product attributes similarly, but differently from respondents in other subgroups. Once clusters are identified, those that present significant commercial potential can be targeted with specific product designs.

Conjoint Analysis offers two major advantages over other techniques. One advantage stems from its decompositional nature.

Conjoint Analysis has shortcomings. The first is the tediousness of participating in the process as a respondent. Generally, the product designers and marketers, by virtue of their intimate involvement with and knowledge of the product, want to answer a large number of issues and test a large number of attributes. The customers on the other hand are generally less engaged and reluctant to submit to lengthy questionnaires. And even though highly fractionated factorial designs are used (a research design that itself introduces serious shortcomings, as discussed later), respondents typically still asked to rate a considerable number of possibilities. For example, in a case where there are 12 product attributes, with four different levels for each attribute, the respondent would face about 35 profiles. That number is often multiplied by a factor of 3 in order to reduce the effect of random errors, resulting in the respondent having to face over 100 questions. The laboriousness of the process often leads to confusion and loss of attention and focus on the part of the respondents, who often end up resorting to heuristics as a shortcut for getting through the questionnaire. (several example Conjoint exercises can be found on the World Wide Web; see, for example, www.conjointonline.com.) For example, instead of properly weighing all the attributes against one another, they only rely on one or two to make their decision, leading to inaccurate results.

More recently, several modifications to Conjoint Analysis that aim to reduce the tediousness of the process, and the resulting inaccuracy of the results, have been proposed and used in practice. These hybrid techniques do not consist exclusively of full profiles of hypothetical products, as in conventional Conjoint Analysis, but they start off by asking the respondent a set of self-explication questions (non-conjoint questions that involve no trade-offs), and follow that with partial-profile descriptions. Examples of such techniques include Adaptive Conjoint Analysis and the newer Hierarchical Conjoint Analysis.

In Adaptive Conjoint Analysis as implemented by Sawtooth Software (the most frequently used technique for commercial conjoint studies in both the United States and Europe, the survey starts by asking the respondent to eliminate those attribute levels that he or she would find unacceptable under any conditions. Those levels are no longer used in the subsequent part of the interview. Next, the respondent is asked to reduce the levels in each attribute to the 5 levels he or she is most likely to be interested in. The next step in the process asks the respondent to rate the importance of individual attributes; these ratings attempt to eliminate those attributes deemed unimportant, and to generate initial estimates of the respondent's utilities, which subsequently are used to generate a set of customized paired-comparison questions using partial profiles. With each response, the estimates of the respondent's utilities are updated, and appropriate paired-comparison questions generated. These questions are designed to converge and focus on the subspace of attribute comparisons that appears most favored by the respondent based on the earlier responses, with the objective of refining the estimates of that respondent's trade-off profile within that limited subspace.

Clearly, Adaptive Conjoint Analysis relies heavily on the self-explicated evaluation component of the questionnaire, where the decision maker is asked explicitly to indicate his attitude towards various attributes separately. A key assumption behind that method is that the respondent's attitudes and preferences are pre-existent and stable. Adaptive Conjoint relies on that assumption to quickly narrow the choices presented to the interviewee and reduce the workload imposed on him or her. Adaptive Conjoint thus precludes the possibility that the respondent might uncover or evolve new personal preferences or attribute trade-off profiles as he or she participates in the study. The problem with that approach is the danger of reification of any preconceived notions or partial, ill-formed preferences the respondent might have a priori, resulting in a sub optimal to the product design problem. In fact, users of Adaptive Conjoint Analysis are warned against allowing respondents to eliminate attribute levels (the first step described in the previous paragraph) "unless there is no other way to make an interview acceptably brief."

A more recent development, Hierarchical Bayes Conjoint Analysis, improves on Adaptive Conjoint through the use of more robust and theoretically more defensible statistical methods. It does not however address the problem described above. Furthermore, Hierarchical Bayes Adaptive Conjoint Analysis relies on the responses of other participants in the study to improve the estimates of each individual's utilities; in other words, Hierarchical Bayes makes it possible to trade the number of the respondents surveyed with the workload on any individual respondent. It is highly computationally intensive procedure however, requiring several hours of running time on a typical personal computer; it is therefore not very useful in a real-time online context. The existing software products perform the Hierarchical Bayes analysis of the data obtained through an Adaptive Conjoint study after the fact, offline.

The second major shortcoming of Conjoint Analysis, one that is not addressed by any of the improved methodologies discussed above, stems from the assumption that the different product attributes are independent of one another. Conjoint Analysis is a "main effects only" model; it assumes there are no interactions among attributes. In the additive part-worths model that is used universally, an individual's preference for a particular product is assumed to consist of the sum of independent functions of the attribute levels in that product. Using an automotive example again, a consumer's preference for exterior color, bright red versus dark gray for example, is assumed not to depend on body style, whether the automobile in question is a sport coupe or a luxury sedan. Yet we know empirically that bright red is a more popular on sporty cars than it is on luxury sedans. If the researcher suspects that there may be some interaction between two attributes (based on product knowledge or from statistical analysis), the solution within the Conjoint Analysis framework is to define composite variables ("superattributes") that are a combination of the two interacting attributes. These super-attributes are given the levels formed by combining the individual attribute levels. Returning to the previous example, the composite attribute would be "color-body style", and it would take on four levels (two times two): "bright red sports coupe", "bright red luxury sedan", "dark grey sport coupe", and "dark grey luxury sedan". The problem with that work-around is that it is highly deleterious to the respondent workload. (It is after all the main-effects only aspect of conjoint that makes possible the highly fractionated factorial designs.) Instead of two attributes with two levels each, we now have three attributes with a total of eight levels. This combinatorial explosion is much more severe when a more realistic number of individual attribute levels is used: in the case of five colors and five body styles, we would go from 10 levels (5+5) to a total of 35 levels (5+5+(5×5).) The number of parameters to be estimated by the Conjoint study, and therefore the number of questions respondents are subjected to, increase in proportion to the number of these levels.

The "main-effects only" nature of Conjoint Analysis has a more subtle and insidious effect, as it affects how many marketers and product developers come to think about their products and services. By relying on Conjoint Analysis to obtain the voice of the customer, they tend to design studies that use those attributes of the product which are more readily decomposable; and they present them in a way that makes it easy for the respondents to separate them. Respondents end up focusing on a few of these attributes, and using them heuristically (as mentioned earlier), and not performing the additional mental processing that would reveal possible interaction between attributes. The result is an artificially good fit to the additive partworths model, but poor predictive accuracy.

More fundamentally, the very notion that a product or service can be adequately described to a consumer by a set of attribute levels is itself problematic. Since it works by presenting decomposable stimuli to the respondent, Conjoint Analysis is particularly ill-suited for understanding how consumers evaluate important classes of products, namely, products that are perceived holistically by the consumer. Examples of such "unitary" products include, but are not limited to aesthetic objects, foods, fragrances, and music. Even though a perfume expert (known as a "nose" in the trade), upon smelling a scent, may be able to analyze it and describe its major attributes, that faculty is not available to the majority of perfume buyers. In such cases, where the respondent cannot break the stimulus presented to him or her into component parts or attributes, attempting to build simple models of the respondent's preference based on factorially designed studies is unlikely to succeed.

By contrast, this invention does not require that the same factors used by the marketer or designer to alter the product be presented to the respondent to assess his or her preference. In the present invention, the respondent is presented by a stimulus that matches the way in which he or she perceives the particular product or service in real-life.

SUMMARY OF THE INVENTION

In a generic sense, the invention provides methods of determining which of a large number of forms of a product, each of which has a plurality of alternative attributes or attribute values, is preferred by a "selector." A "selector," as used herein, is one or a group of persons whose input is being considered during the course of the practice of a method of the invention. "Selector" may refer either to a collection of entities participating in an exercise, or a single person, or the individual entities participating in an exercise. A selector may be a focus group, a working group of designers and/or managers within a company or professional design service organization, a group of people representative of a target demographic group, members of a club or class dedicated to some activity or pursuit, enthusiasts who are potential customers for a given product such as dog owners, golfers, interior decorators, cyclists, homeowners, teen-aged boys, persons who are employed by a company or who work within an industry, etc. Persons acting as selectors have presented to them once or serially groups of, for example, two to a dozen or so different possible design forms. In the aspect of the invention referred to herein as the virtual salesperson, the selector is an individual, a purchase agent, or a small group such as a couple or a family.

The selector also may comprise a group of persons engaged in a cooperative design of a product, such as a group of young women designing next spring's fashions, a professional industrial design group designing an automobile seat, a small group of architects designing a home for a client, or a group of musicians composing a piece of music. In this case, once a consensus for a design is reached the method may include the additional step of producing a plurality of units of a selected product form or a product resembling that form. When the selector is a group of persons, the derived group of product forms presented to a person in the group may be generated using data indicative of the preferences expressed by one or more other persons in the group. Also, the invention contemplates repeating the presentation of specific product forms within a particular derived group to one or more persons serving as the selector.

"Preference," which may also be referred to as "affinity," as used herein indicates a selector's favor (or disfavor) for a particular item having a set of attributes. In one embodiment a positive affinity value indicates that the selector favors a particular item while a negative value indicates that the selector disfavors that item.

In the methods of the invention, the proposed designs are presented to the participants, and feedback from the latter is collected via, for example, individual personal computers connected in a network such as an intranet, an extranet, or the internet. It is accordingly possible to control the interpersonal dynamics among the participants. It is also possible to isolate them completely from one another, so that no one of them is aware of the preferences expressed by the others. It is also possible to allow selective levels of information to be shared among the participants, to initiate a real or virtual group discussion, to control the degree of social pressure they may feel, to satisfy a craving for information about the status or direction of the project, or for information about what products others have purchased. This could be used to mimic the network externalities that take place in real life, where some people tend to favor the same products that their peers are buying and consuming, while others may choose to take a contrarian attitude. This is important in such products as fashion apparel or accessories, investment instruments or portfolios, computer software, and so on. Furthermore, by connecting participants via a computer network, it is possible to assemble a group of participants that are located in very different geographical locales. The methods also facilitate time management, as they reduce the need to bring together all participants at the same time by seamlessly integrating data that is received at different points in time (in certain embodiments of the invention.).

"Products", as used herein and explained more fully below, is intended to be a generic term referring to goods, such as objects intended to be mass produced, modularized goods such as personal computers which comprise a plurality of interchangeable parts suitable for mass customization, services, such as mutual funds or travel services, and plans, such as a written list of alternatives for governing future conduct of an individual or organization, such as a business plan or a menu of food items to be consumed by a group.

"Attributes" of a product, as used herein, is intended to refer to the structural, functional, stylistic, or economic features of the product, service or plan and include things such as cost, color or color combination, size, strength, shape, style, pattern, length, weight, content feature, theme, option, choice of material, softness, etc. The product attributes may be aesthetic or functional. A given product has a series of possible attributes that are combined using the method of the invention to develop a design. Different types of objects of the design or selection obviously will have different groups of possible attributes. Thus, for example, designs for an aesthetically pleasing exterior appearance of a hands-free telephone would have "attributes" such as material (e.g., plastic or metal), distribution of materials (e.g., plastic sides with metal top), texture, color, color combination, length, width, thickness, size of controls, shape of control, color of controls, position of controls, position of status lights, speaker grill pattern, etc. Designs for a billboard would have attributes such as dimension, aspect ratio, dominant color, background color, color scheme, size of print, presence or absence of pictorial material, various types of content for pictorial material, number of people in a scene, site of the scene (big city, pastoral setting, domestic setting, dance hall), etc.

The term "attribute" denotes both elements that are absolute, in the sense that they are either present in the product or not, and relative, in the sense that an attribute can have many values, or be broken down into many subtypes. In this respect, the meaning of "attribute" as used herein is broader, and distinct from the term as used in the conjoint analysis literature. An example of the former is the presence or absence of a clock in an auto dashboard design or a collar on a dress design. An example of the latter is the radius or other measure of the degree of curvature on the bow of a boat hull design, or the reflectivity of the glass covering a building.

Broadly, the invention involves generating and presenting, typically electronically, a number of design alternatives to persons who are participating in the design, selection, or market research exercise. The participants (referred to as "selectors") transmit data indicative of their preferences among or between the presented design alternatives, and that data is used to derive a new generation of design alternatives or proposals. The new designs are generated through the use of a computer program exploiting a genetic or evolutionary computational technique. The process is repeated, typically for many iterations or cycles. Depending on the purpose of the effort and how the method is designed and run, it can be used in a number of new and useful ways. It can serve to design new products or services that are appealing to individual consumers or a targeted group of consumer, to facilitate group design efforts, to conduct market research in a better way than previously possible, e.g., probing the affinity of individual consumers, demographically defined groups of consumers, or consumers with a particular state of mind, for a given product or service. It can also be used to design a product or service that will appeal to a participating group, or to serve as a virtual salesperson, effectively facilitating a shopper's choice of what to buy. Stated differently, the invention permits an individual shopper to quickly make a rational selection of a product from a potentially vast number of similar products having various combinations of features and attributes. One advantage of the proposed invention is that the participants assess several design candidates over a number of successive iterations. This is particularly helpful in those design situations that involve novel or unusual styles, as is the case with apparel and automobile styling, to name two examples, where the initial exposure to such an unusual design may elicit initial reactions that are inaccurate.

The invention may exploit various ways to gather data indicative of preference and various ways to tabulate, filter or aggregate, and use that data. Thus, data obtained from a subset of the persons comprising the selector may be given a disproportionate influence on the generation of the derived group of product forms, i.e., discounted, elevated in importance, or ignored. The selector may be permitted to specify an attribute of said product before or during the iterations of derived groups. This may involve fixing the value of that attribute at a particular value, or preventing that attribute from taking on particular values that the participant finds undesirable. Before beginning the iterative selection/design process, the system may obtain certain preference information from the selector and may use at least a portion of the information obtained in such prescreening to constrain the subsequent generation of derived product forms. For example, such information may include the range of prices the seller is willing to pay for the product, selector body size information, product style information, color preference, material preference, a performance specification, or a list of selector desired product functions.

In one preferred embodiment, the method comprises the additional step of effecting a sale to the selector or a subset thereof (one or a group of persons comprising the selector) of a product based on a selected product form. The product may be produced for delivery to the selector by mass customization, i.e., by an organization dedicated to producing upon request any one of a large variety of forms of the product as dictated by a particular purchaser (such as bicycles, footwear, or clothing). Alternatively the product based on the selected product form may be a product which exists prior to its identification by the selector, e.g., is sold from an inventory. Practice of this aspect of the invention preferably involves a program that presents derived groups of product forms that a seller has available in inventory or can easily or profitably be made or purchased. Thus, in this aspect, the method functions as a virtual salesperson, one that discerns the selector's preferences and suggests alternatives that may be appealing to the selector based on the incoming captured data, and subtly influences the selector's choices by the sequence or selection of presented product forms.

Viewed from another perspective, the invention comprises a computer-aided bridge between incompatible constituent elements of the language of the science of design, on the one hand, and the cognitive language and thought processes employed by consumers when they consider their preferences or consider a purchase. It is this dichotomy which heretofore has inhibited effective consumer input to design tasks, input that is truly reflective of their preferences. The design engine and virtual salesperson embodiments of the invention described herein essentially comprises a computer-mediated translation device, converting seamlessly and effectively the preferences of consumers, which often defy verbal description, into design-specific data specified through variables useful in implementing design. By allowing a consumer to evaluate an evolving set of whole designs, each of which incorporates aspects relative to that consumer's preference determination, the consumer is permitted to drive directly the design or product selection process without being familiar with specific design attributes or language. For instance, the curvature of an arm on an easy chair may be an attribute that affects the look of the char and the subjective aesthetic assessment of a consumer, but often cannot be specified by a consumer ignorant of variables affecting chair design. The reason many people may say that they cannot specify what they like until they see it may be because consumers generally are untrained in the language of design. The "design engine" (defined later) seeks to overcome this underlying constraint as set forth herein. Designers who may not be knowledgeable about how a consumer actually evaluates a particular design can use the invention without being significantly disadvantaged. Similarly, consumers ignorant of design theory and principle can achieve a design that they like and that has a good chance to endure as a favorite.

As noted generally above the preferred apparatus for implementing the methods of the invention comprise a network wherein the program resides in a server which is linked to plural terminals. The terminals employed in the apparatus may comprise a computer, a television, a telephone, a personal digital assistant, or other electronic device coupled wirelessly or via wires to a server. The apparatus most typically comprises a plurality of terminals. Of course, given the current state of the information technology art, other system architectures may be used to embody the system of the invention for implementing its various methodologies.

The method may involve iterating the cycle of selection and derived product form generation a sufficient number of times to permit determination of one or a plurality of product forms preferred by the selector. Particularly in a group design effort where the selector is a group of consumers, this may lead to the identification of more than one preferred design. Collecting demographic data about the selector and correlating the product forms preferred by the selector to the demographic data permits identification of market segments which may be exploited using differing strategies. Accordingly, the invention facilitates a new form of market research, in which its proprietor is enabled to discern the relative affinity of a consumer or group of consumers for a given product form, or to discern market segments, for example, early adapters, late majority, etc.

The derived group of product forms next are presented to one or more persons comprising the selectors, who again input data indicative of their preferences, this time with respect to the new set of product forms, and the process is repeated until a stopping criterion is met. The stopping criterion may be, for example, a decision to purchase made by the selector, the cycling of a predetermined number of iterations, the reaching of a consensus agreement on attributes by a plurality of persons comprising the selector; the participation of a predetermined number of persons comprising the selector; the achievement of a predetermined number of assessments, the passage of a predetermined time for conducting the exercise, the arrival of a point in time in the future, the intervention of a supervisor such as a person who judges that a good design has been achieved, the lack of improvement in emerging product forms as judged by a person comprising the selector or a supervisor, or a suitably programmed computer; the selection of a specific product form by a person comprising the selector, the convergence of all design alternatives generated by the evolutionary algorithm to a small enough number of possibilities (i.e., the loss of genetic diversity or the arrival of a certain level of similarity in the population of designs), or some combination thereof.

Persons participating in the exercise making up the selectors will of course have preference profiles which may well evolve during a design cycle. The participant may be influenced by peer choice in group dynamics. Also, his or her preferences may be adjusted because he or she sees and thinks about alternatives in a more rigorous way then may otherwise be the case. Perhaps most significantly, participation in a design exercise by a person may well serve to increase that participant's confidence level in providing evaluations. Often, early generations of product alternatives may be fraught with low confidence evaluations. However, during the evolutionary design process, as the consumer's preferences are increasingly reflected in the design attributes, the consumer's own evaluations may well be made with a greater confidence. A similar phenomenon is that some consumers make purchase decisions more confidently if they have researched a product. Furthermore, inclusion of the consumer's design through repeated steps and the concentrated thinking about what really is his preference may well lead to a higher frequency of purchases than otherwise might be the case. Based on these behavioral insights, in accordance with the invention, in some embodiments it may be valuable to permit participants to input data indicative of the confidence they have in their preference at least at some points in the iterative process. The level of confidence in a design as expressed by a participant can be used as a cycle stop criterion, at least with respect to a particular participant.

The invention contemplates the use of a wide variety of programming techniques to aid in the achievement of the goals of a given exercise. Generally, many known computational techniques can be exploited in the design of computer programs useful in the methods and apparatus of the invention, and they can be adapted by the skilled programmer to achieve a given purpose. The preferred techniques are genetic or evolutionary computation techniques (GEC's) such as genetic algorithms, evolution strategies, distribution estimation algorithms, and genetic programming; other computational techniques the use of which is contemplated in the present invention include generative grammars, hill-climbing, simulated annealing, random search, a generator of random attribute values, statistical design of experiments techniques, or a combination thereof. Conjoint analysis techniques also may be used, e.g., in weighing of attributes of product forms derived from the expressed preferences. When this type of analysis is used in combination with genetic or evolutionary computation techniques it is possible to decrease the number of iterations needed in a given exercise to obtain the desired information.

The program may execute a genetic algorithm operation, an evolution strategy operation, a genetic programming operation, a conjoint analysis operation, a generative grammar operation, a generator of random attributes operation, or any other to generate a derived group of product forms. The program may select from a set of product attributes to assemble a derived set of product forms and/or may exploit a function which can generate new or modified attributes. The program also may permit a selector to delete a generated product form, to introduce a new product form within a derived group of product forms, to impose a constraint on the generation of a derived group to those forms comprising a preselected attribute or attribute value, or to those not comprising such particular attribute or attribute value, or to specify an attribute of the product or other object of the exercise. The apparatus may further comprising means for storing a plurality of product forms preferred by a selector and electronic means for effecting a sale to a selector of a product form she selected.

These various computational techniques are not per se considered an aspect of the invention, except insofar as they are used in combination with other process steps as set forth herein or as may be set forth in some of the appended claims. The invention also includes systems utilizing multiple levels of genetic or evolutionary computation techniques where, for example, the output of a first algorithm is used as the input of the next. The computer programs may embody various acceleration strategies, i.e., code implementing logic that reduces the participants' voting load, for example by using adaptive statistical models of the participant to evaluate some of the designs, or code that may reduce the number of design cycles needed to discern adequate or optimal forms by seeding the product form populations with "good" designs, by evolving higher-level modules first in the case of designs that are modular in nature, or by the use of various constraint parameters to reduce or eliminate impractical or impossible designs.

The method broadly comprises the steps of presenting, e.g., through a computer display or output device of some type, to the selector a group of product forms, each of which has a particular combination of attributes. The way these initial product forms are designed or chosen is not critical, but may involve screening of candidate designs to reflect previously articulated preferences of the selector or a supervisor. The presentation typically is made electronically, e.g., by presenting graphical, alpha numeric or other visual data representative of the design alternatives or forms. Visual sensing of the presentation is not a requirement of the invention as the product being designed or selected may by an audible product sensed aurally such as a tune or a jingle. Attributes of the product may be sensed tactilely to discriminate among or between smoothness, texture, temperature, ergonomic curvature or softness, or degrees thereof. It is also possible to employ the methods and apparatus of the invention to design or select fragrances sensed nasally and tastes sensed orally or orally/nasally.

Next, the methods of the invention have the selector express a preference for a subset (one or more) of the presented product forms, and data indicative of the preference expressed by the selector is captured for use in evolving design alternatives. As disclosed herein, a variety of voting schemes may be used, with the selection of the protocol for gathering, aggregating, screening, or otherwise conditioning the data being dependent on the goals of the exercise. The captured data is entered into a program for generating a derived group, or "next generation" of product forms. These including product forms having either or both a new attribute (e.g., a new color or a new shape for a part or component of a product design), attributes with new values, or a new combination of attributes. As noted above, the program exploits various known or as yet to be developed approaches, strategies, data treatment methods, and algorithms to generate the derived group or next generation. The important aspect of the program in accordance with the invention is that the captured data influences the construction of the derived forms.

The program may select from a set of product attributes to generate at least a portion of a given derived set of product forms, or may exploit a function which creates or modifies an attribute. The program also may permit or encourage a selector or a third party, e.g., the proprietor or supervisor of the system, to delete a particular generated product form or to introduce a new product form at any point in the cycle. Also, the program may permit a third party or the selector to constrain generation of a derived group to those comprising (or, alternatively, not comprising) some preselected attribute (or attribute value) so as to enrich (or alternatively deplete) the population of derived product forms with that attribute, i.e., may be responsive to boundary conditions set by the selector or a supervisor controlling the system.

Adaptation of these computation techniques (or as disclosed below, voting techniques) for a given goal involves, for example, in the case of the market research embodiment, controlling the algorithm/program so that the participants (typically a large number of consumers on line) are provided through the computer program with a variety of product forms in successive generations which are designed specifically to present eclectic, widely varying design alternatives so as to promote exploration of the design space having diverse combinations of product attributes. Alternatively, or in addition, the computer program generates derived product forms which converge on a set of product attributes matching the preference of one or a subset of consumers, i.e., evolving toward a "fit product"—one that best matches the consumer's preferences. In still another aspect, the computer program generates derived product forms which converge on a plurality of forms of products having sets of product attributes matching the preferences of a corresponding plurality of subsets of consumers. Thus, the system can permit identification both of groups of consumers with similar preferences and designs which satisfy that preference.

In yet another preferred embodiment, referred to herein as the "virtual salesperson" the invention provides a method for promoting selection by a shopper of a product from among a large number of similar product forms having alternative attributes. The method comprises the steps of presenting electronically to a shopper a group of product forms, each of which has a particular combination of attributes, enabling the shopper to express a preference for a subset of the presented product forms he or she prefers, capturing data indicative of the preferences expressed by the shopper, inputting the data into a program for generating a derived group of product forms, including forms having a new attribute or new combination of attributes, the generation of which is influenced by the captured data, presenting to the shopper at least some of the derived group of product forms, and repeating the data capture, inputting, new choice generation, and presentation steps until a stopping criterion is met, typically a purchase decision. Again, the method is implemented preferably by an electronic network, most preferably in the Business to Business and Business to Consumer contexts via the internet.

For embodiments in which the system serves as a "virtual salesperson," one can control the algorithm/program so that the participant (typically a single shopper) is provided through the computer program with designs (purchase options) of preexisting products or services, products that can be manufactured easily, or product inventories that are available for sale. By "preselecting" the new product alternatives in respective generations, the system leads the shopper to a product he or she prefers among existing, particularly profitable, or overstocked wares, or to the form of the product he or she finds most appealing.

In the embodiment of the invention referred to herein as a "design engine" the selector is a relatively large group of consumers, or persons who may or may not work for the same organization, be members of a common demographic group, or include professional designers. In the aspect of the invention concerned with facilitating the collection of market data, the selector typically is a group of consumers.

In one important embodiment, the invention provides methods of collectively designing a product having a potentially large number of forms, each of which has alternative attributes. The method may be embodied in a suitably configured computer or network of computers which serve as a design engine. The method comprises the steps of presenting electronically to each of a plurality of persons a group of product forms, each of which has a particular combination of attributes, enabling the persons to express a preference for a subset of the presented product forms they prefer, capturing data indicative of the preferences expressed by the persons, inputting the captured data into a program for generating a derived group of product forms (including forms having a new attribute or new combination of attributes, the generation of which is influenced by the captured data), and presenting to a plurality of persons the derived group of product forms. The process steps are iterated until a stopping criterion is met, such as the discovery of one or a plurality of product forms preferred by said persons. Then, one may produce a plurality of units of a product based on a selected product form, and sell a product based on a selected product form to one or more of the person or to others. The selecting persons may be, for example, professional designers or members of a focus group.

The method may involve iterating the cycle of selection and derived product form generation a sufficient number of times to permit determination of one or a plurality of product forms preferred by the selector. Particularly in a group design effort where the selector is a group of consumers, this may lead to the identification of more than one preferred design. Collecting demographic data about the selector and correlating the product forms preferred by the selector to the demographic data permits identification of market segments which may be exploited using differing strategies. Accordingly, the invention facilitates a new form of market research, in which its proprietor is enabled to discern the relative affinity of a consumer or group of consumers for a given product form, or to discern market segments, for example, early adapters, late majority, etc.

In another embodiment, the invention provides a method of reaching consensus among a group of participating persons, such as business managers, on a plan or menu having a potentially large number of alternative attributes. The method comprises the steps of presenting electronically to each of a plurality of participating persons a group of alternatives, each of which has a particular combination of attributes. The persons express a preference for a subset of the presented alternatives. Data indicative of the preferences expressed by those persons are entered into a program for generating a derived group of alternatives, including plans having a new attribute or a new combination of attributes. The generation of the new, derived alternatives is influenced by the captured data, and the derived group of plan alternatives then is presented to a plurality of participating persons. The data gathering, new plan generation, and presentations are repeated until a consensus is achieved. This process may be implemented on an intranet as groupware, or on the internet. The generated alternatives may be plans that are preferred by a supervisor which are presented to the participating persons so as to induce them to choose attributes of a supervisor-preferred plan. Again, the method may involve the additional step of constraining generation of a derived group of alternatives to those comprising a preselected attribute or set of attributes.

BRIEF DESCRIPTION OF THE DRAWINGS

The advantages of the invention described above, together with further advantages, may be better understood by referring to the following description taken in conjunction with the accompanying drawings. In the drawings, like reference characters generally refer to the same parts throughout the different views. Also, the drawings are not necessarily to scale, the emphasis instead is placed on conveying the concepts of the invention.

FIG. 5 is a screenshot depicting one embodiment of a registration page useful in connection with the invention.

FIG. 7B is a screenshot depicting one embodiment of a second voting screen following vote submission.

FIGS. 10 and 11 are screenshots showing the items presented to participants during one embodiment of a design exercise.

DETAILED DESCRIPTION OF THE INVENTION

Figure 1:
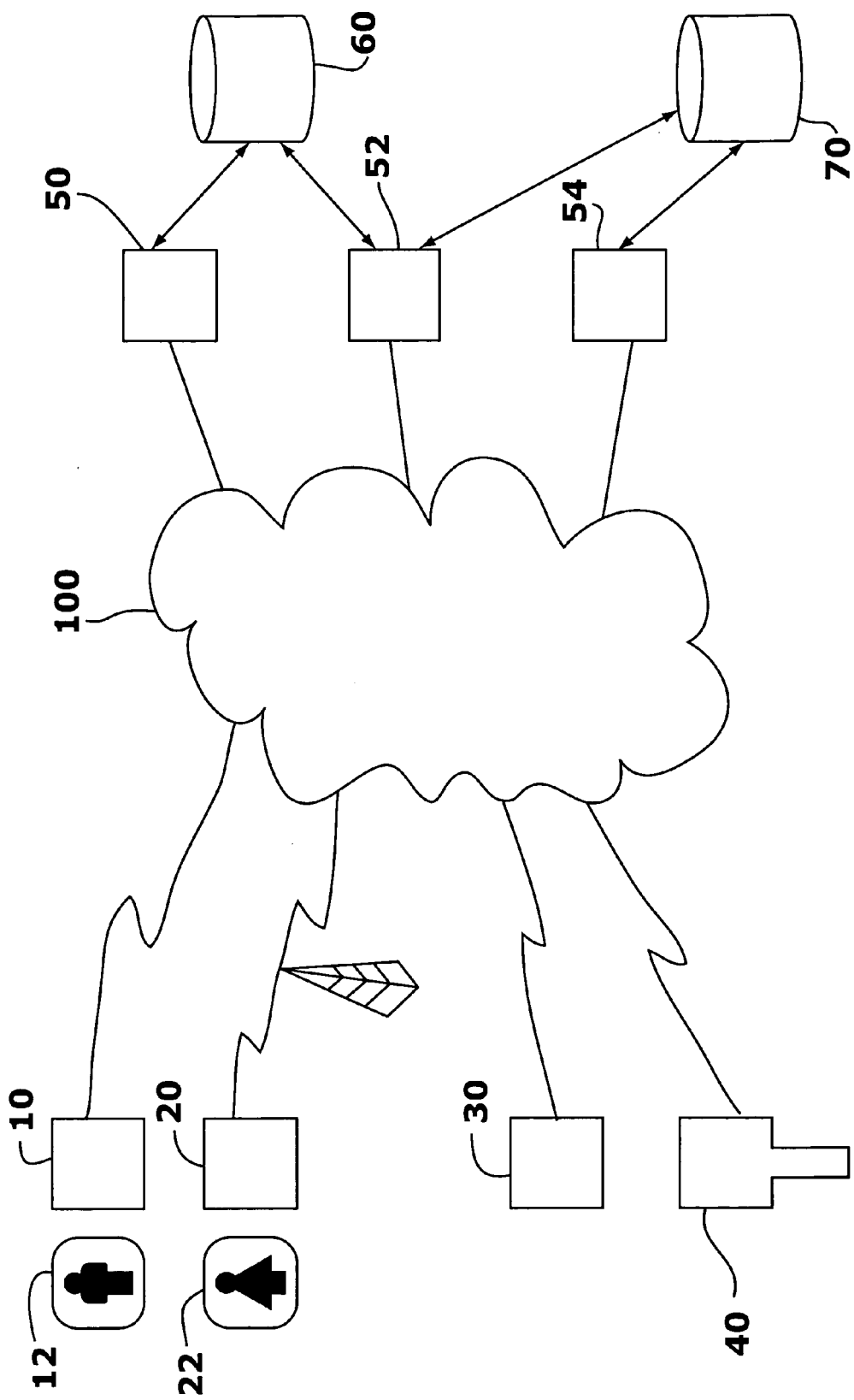
FIG. 1 is a block diagram illustrating one embodiment of the system for performing the invention.

FIG. 1 shows one embodiment of an environment in which the present invention may be used. Selectors may use one or more client systems 10, 20, 30, 40 to communicate with one or more server computing systems 50, 52, 54 over a network 100. The network 100 can be a local-area network (LAN) such as an Ethernet network or a wide area network (WAN) such as the Internet or the World Wide Web. Client systems 10, 20, 30, 40 can be connected to the network 100 through a variety of connections including standard telephone lines, LAN or WAN links (e.g., T1, T3, 56 kb, X.25), broadband connections (ISDN, Frame Relay, ATM), and wireless connections. The connections can be established using a variety of communication protocols (e.g., TCP/IP, IPX, SPX, NetBIOS, Ethernet, RS232, and direct asynchronous connections). For example, the network 100 may be a corporate intranet connecting decisionmakers in an organization to a centralized decision engine, or it may be a secure extranet or virtual private network connecting different entities such as a company's suppliers or consultants to the company's design engine.

As shown in FIG. 1, client systems 10, 20 may be client computing systems typically used by a user, such as any personal computer (e.g., 286-based, 386-based, 486-based, Pentium-based, iTanium-based, Power PC-based), Windows-based terminal, Network Computer, wireless device, information appliance, X-device, workstation, mini computer, mainframe computer, personal digital assistant, or other computing device. In these embodiments, client systems 10, 20 may use any one of a number of windows-oriented operating systems such as Windows 3.x, Windows 95, Windows 98, Windows NT 3.51, Windows NT 4.0, Windows CE, Macintosh, Java, Unix, and Linux. In this embodiment, the selector comprises the user 12, 22 interacting with the system via the client devices 10, 20.

In other embodiments, a client system 40 is an information kiosk located in a retail establishment. In these embodiments, the client nodes 40 may include a touch-sensitive screen or membrane keyboard for receiving consumer input. In other embodiments, the client system 40 is a retail point-of-sale terminals that collects consumer reference information from sale transactions. Client system 30 in FIG. 1 depicts an embodiment of a selector that is a proxy for a real person, such as a computer programmed and trained as a neural net, a statistical model, a distribution estimation algorithm, a reinforcement or Q learning method, a learning classifier system, or other machine learning methods or expert systems. In these embodiments, client system 30 may be one or more processes (threaded or otherwise) that implement evaluative models or algorithms, such as neural net models, learning classifier system, statistical models, or an expert system, which emulate the voting preferences of a human and which vote by proxy. These processes may execute on client system 30 and communicate with server systems 50, 52, 54 via network 100. Alternatively, the client system 30 may execute on the server systems 50, 52, 54 and communicate with various server processes using pipes, shared memory, or message-based communication such as remote procedure calls.

In many embodiments, one of the servers 50, 52, 54 is responsible for presenting to selectors the initial population of product forms, generating the derived product forms to be presented to the selector, and capturing and processing the data that is indicative of the selector's preference. This server is referred to as the "presentation server." An attribute database 60 stores the possible attributes available for generating product forms. A voting database 70 stores the preference data obtained from the selector during the course of the process. In some embodiments a single database is used to store both the possible product attributes as well as obtained preference data.

Another of the servers 50, 52, 54 implements generative and evolutionary computation programs that utilize the stored attribute data and the stored preference data to generate representations of the product forms. This server is referred to as the "generate server." The presentation server processes these product form representations to generate product forms that can be presented to the selector.

Yet another of the servers 50, 52, 54 serves as a vote aggregation analysis server. This server plays several roles: it captures the preference data coming from the selector and stores it in the voting database 70; it also analyzes the data and transforms or conditions it into a format that can be used by the generate server; it is also used to develop models, such as statistical or neural net based models or other machine learning models of the selector preferences, and may use these models to eliminate some of the forms generated by the generate server prior to presenting them to the selector. Additionally, it may provide data indicative of the preference of subsets of the selector, which may be appended to the presented forms by presentation server. Although depicted as separate servers, the generate server, presentation server, and vote aggregation/analysis server may be embodied as any number of physical servers.

For embodiments in which the invention allows for or exploits a purchase decision by the selector or subset thereof, one of the servers 50, 52, 54 may be an e-commerce server. For example, a purchase decision may provide one of the stopping conditions for a design exercise, or individuals comprising the selector may be permitted to place a purchase order for one of the intermediate product forms that they find satisfactory. The e-commerce server, which is well understood by those skilled in the art, uses a database containing customer information such as billing information and shipping address. The e-commerce server may be used to obtain the relevant billing and shipping information from the client, process it, store it in the database, and forward the relevant data to the order fulfillment entity.

The selector also may comprise one or more computers programmed as a statistical model, neural net, learning classifier system, other machine learning models, or with other appropriate software algorithms "trained" to mimic or simulate a consumer's preference pattern. Such a surrogate selector can, among other things, facilitate the feedback and evaluation process during a computer-driven emergent design cycle. A suitable computer program can facilitate or even eliminate the consumer's participation except perhaps as a supervisor. For instance, after going through a training phase, an evaluation program may express a suggested preference pattern (evaluation) for a given set of alternatives for the consumer to accept or adjust before submission as input to the generation program. After repeated cycles, the consumer may allow his or her personal evaluation program to provide unsupervised input to the generation program for several cycles before pausing to allow the consumer to make adjustments. Ultimately a sense of trust may develop between the consumer and the evaluation program that allows the evaluation program to act as a proxy for the consumer. An advantage of such a method is that the evaluation program-generation program can interact for several cycles starting from many initial seed evaluation sets (alternatives) in order to scout more fully the fitness landscape between the consumer preferences and particular design alternative.

The neural net, learning classifier system, machine learning system, expert system, or other type of evaluation programs can be trained using a set of emergent design cycles with computer generated alternatives and consumer specified evaluations. The prospect of having a personalized evaluation program available to assist in the future interactions with the emergent design process may be an inducement to the consumer to engage in a large set of design cycles.

In other embodiments of the invention, the selector consists of a single individual, i.e., the system is a single-user system. In this case, there are no multiple votes to be aggregated and analyzed. Therefore, the voting database 70 is used to store the preference data throughout the design exercise or decision making process for the particular selector. The voting database 70 may also contain preference data from other selectors who may have participated in similar exercises previous to the current one, including data from exercises in which the same selector may have participated previously. One of the servers 50, 52, 54 collects, analyzes and stores the incoming preference data from the selector; it may also be used to provide feedback to the participant by providing data to the presentation server, which is indicative of the evolution of the selector's preferences over the duration of the exercise, or which may provide the selector with a basis for comparing present preferences to data stored in the voting database 70.

This embodiment may be used to implement the virtual salesperson embodiment of the invention. It may also be used to implement a one person design exercise via an application service provider model. Of course, such a system alternatively could be embodied in a single, suitably programmed computer.

Figure 2:
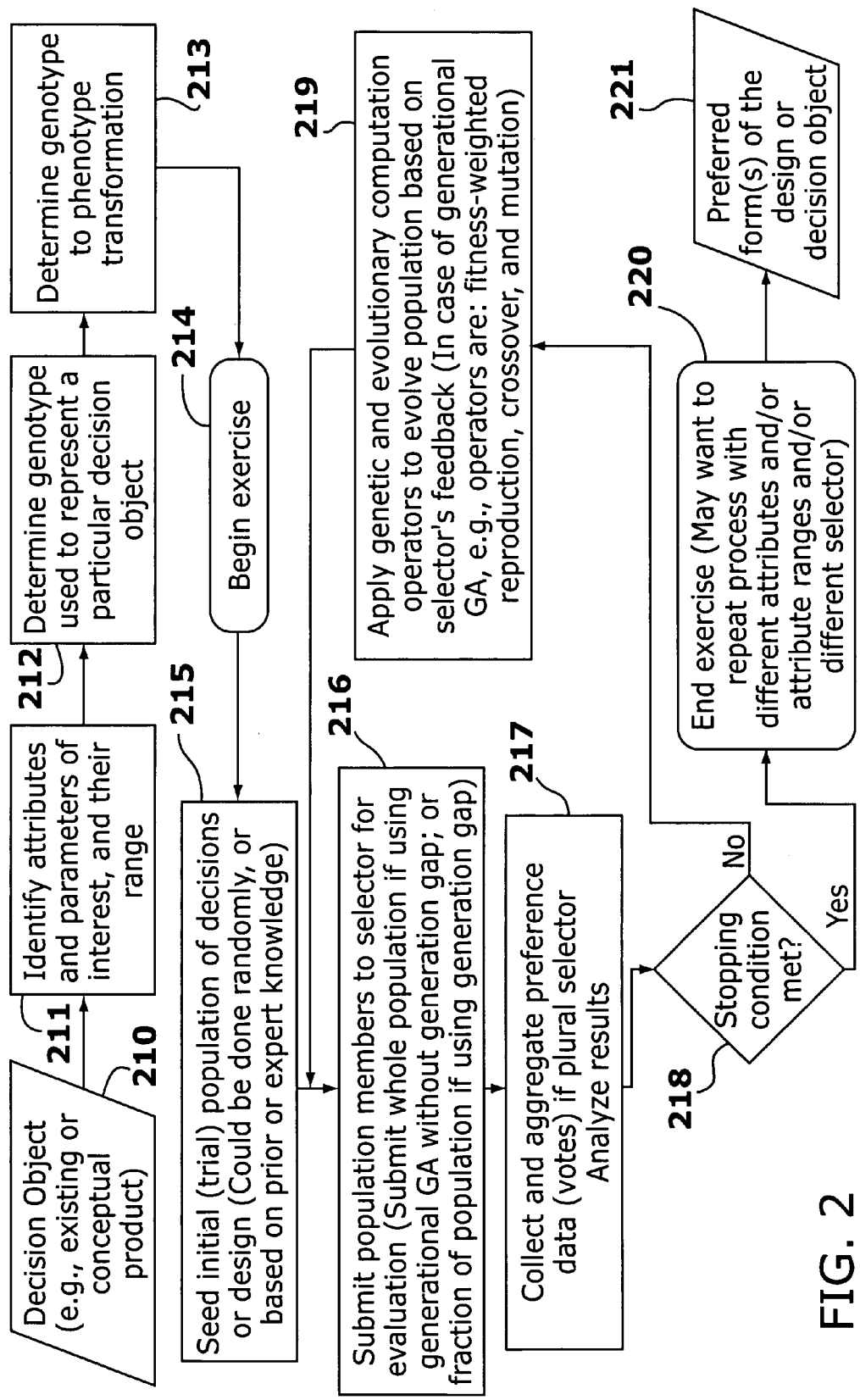
FIG. 2 is a flowchart showing one embodiment of the process steps of decision making or design exercises conducted in accordance with the invention.

FIG. 2 is a process flow diagram for an exemplary decision making or product design exercise, embodying a method of the invention.

In this example, the process starts with identifying the object of the exercise, that is, the decision object or the design object, represented by block 210. At this point, the object is identified in very general terms, such as, "the colors of a tennis shoe," "next week's meeting agenda," "the menu for next month's association meeting." In some embodiments, the step of identifying the object of the exercise 510 is skipped such as in the "virtual salesperson" embodiment. Next, in step 211, those attributes of the object that will be permitted to change during the exercise are identified, and the different values that they will be permitted to take on are determined. For example, in the case of the colors of the tennis shoe mentioned above, step 211 may involve identifying the individual elements of the shoe which are subject to design variation; the result may be: the vamp color, the eye stay color, the tongue color, the heel color, the sole color, and the laces color. Furthermore, the range of colors that each of these elements may take are established. For example, the laces may have three different colors they can take on, e.g., white, black, and red, or there may be four shades of red, or red attributes with different values. Similarly, there may be eight colors that the vamp may take, e.g., red, blue, white, green, orange, black, yellow, and purple. Furthermore, in other embodiments, certain constraint rules may be implemented that prevent, for example, a certain color of laces to be used with a particular color of the tongue. In other embodiments, an attribute may have a continuous range of values.

The next step in the process, represented by block 212, involves determining the representation or genotypic coding that will be used to represent the particular design or decision object internally, in the genetic algorithm, genetic program, or other GEC program. In the case where a genetic algorithm, the "genotype" is a data structure that encodes each attribute value, such that a particular instance, combination of attributes, or "value" of that structure represents one particular product form. It is directly tied to the previous step 211, in which the attributes and their possible values are decided, sometimes called "featurization." Continuing with the example of the tennis shoe colors, an appropriate genotype might consist of six integers strung together, each of which can be thought of as a gene representing one of the identified features such as the laces color. That integer in turn would be limited to taking on distinct integer values, here, as an example, three, say 0, 1, and 2, each of which is used to represent one of the three predetermined, allowable colors for the laces. This example genotype structure is shown schematically below.

| Integer 1 | Integer 2 | Integer 3 | Integer 4 | Integer 5 | Integer 6 |
|---|---|---|---|---|---|
| Represents vamp color | Represents eye stay color | Represents tongue color | Represents heel color | Represents sole color | Represents laces color |
| Range: 0–7 | ... | ... | ... | ... | Range: 0–2 |

In another example, it may be that the values that a gene can take on are not indices for predefined attributes, but rather represent a physical parameter. For example, if one of the design parameters identified in 211 was the height of the heel of the shoe, then a gene coding it might be a real number allowed to take on values, for example, between 0.5 and 1.5, where the number represents the actual height in inches. In another case, the integers or real values by the genotype may represent parameters that are used in a complex computer-aided design program that generates different forms based on these parameters; for example, the parameters may represent the dimensions and radii of curvature of certain shapes, and/or the parameters of a Bezier curves that make up the shape.

In one embodiment, products may be described as models in a CAD/CAM system, and design features may be extracted from the CAD/CAM model of the product automatically by the CAD/CAM system. For example, a product may be represented in a CAD/CAM system by a table linking model attributes and the specific value of an attribute. The model attributes may be thought of as the respective "genes" for a product and the specific values of the variables as the "chromosome" values or specific "alleles". The attribute values can be manipulated by making API calls to the CAD/CAM system.

The next step in the flowchart, represented by block 213, involves determining a mapping or transformation from the genotype representation described above, a data structure internal to the evolutionary algorithm, to the phenotype which is the corresponding form representation that can be presented to the selector. In the example of the tennis shoe color, this mapping is trivial, as there is a simple correspondence between a particular feature color and its index value. In other cases, this mapping may be more complex. For example, in a case where genetic programming is used, the genotype may encode a program or set of instructions that generate a product form, say a geometric shape, or determining the parametric computer aided design model of a shape, the parameters of which are encoded by the genome.

The preceding steps, 210 through 213, are preparatory steps for the iterative part of the process, which begins at 214. In 215, an initial population of possible solutions— possible designs, possible decisions, possible menus—is generated. In the language of Genetic and Evolutionary Computation, this initial population is often referred to as a seed population or trial population. Typical population sizes may range from 2 to 100,000. In some embodiments, typical population sizes range from 3 to 50,000. In more preferred embodiments, typical population sizes range from 4 to 10,000. In still more preferred embodiments, typical population sizes range from 5 to 1,000. In a most preferred embodiment, the typical population size ranges from less than 50 to 600. Each member of the population is an instance of the genotype described earlier, that is, a data structure where each field or "gene" takes on one of its allowable values; these are also referred to as chromosomes. The seed population may be generated by picking random values from the allowable ranges for each field in the chromosome. Other possible ways to populate the initial set of possible solutions is to use chromosomes that are the result of a previous exercise, ones that represent product forms designed by people using other (more traditional) means, or among other methods which depend in part on the goals of the process.

Once the initial population is generated, it is presented to the selector for evaluation. This step is represented by 216. Presenting the possible solutions may require using the genotype to phenotype transformation scheme that was determined in 213. Step 216 may involve presenting the whole population of possible solutions to the selector, or it might involve presenting a subset of that population. In some particular embodiments, the selector is presented with subsets of, or "windows" onto, the global (in this case, the initial) population. For embodiments involving CAD/CAM systems, step 216 requires the CAD/CAM system to render the respective members of the population. At a minimum, two of the possible solutions are presented to the selector. At 216, along with the presentation of the product forms, the selector also is presented with means for expressing a preference among them. This can be implemented in any number of ways, from clicking on the ones that are deemed good, to moving the assigning grades to the various forms presented, ordering the forms by order of preference, and so on. Each of these methods results in particular types of preference data that is captured and used in the next step. In particular, one way a selector may indicate his of her preference is by issuing a purchase request for one of the forms presented, one that is presumably deemed satisfactory.

In step 217, the preference data from the selector is collected and analyzed typically electronically. In the case where more than one individual comprise the selector, the preference data from the different individuals must be aggregated and conditioned to make it usable in the subsequent steps of the process. In this step, any number of vote aggregation methods may be used. It should be noted that the vote aggregation method and the method provided to the selector to express their preference are technically related.

The voting systems useful in the practice of the invention may be generally classified into five categories: (1) majority rule and majoritarian methods; (2) positional methods; (3) multi-stage methods; (4) utilitarian methods; (5) and proportional methods.

Majority Rule and majoritarian methods rely only on information from binary comparisons between alternatives. Perhaps the most familiar example of a majority rule is the presidential election process in the United States, which is often a choice between two candidates. The winner of a majority rule election scheme is the alternative (or candidate) preferred by more than half of the voters. For cases in which more than two alternatives are presented, then some other procedure, such runoff elections, are needed to whittle the number of alternatives down to two (or to group the alternatives into two groups). Simple majority rule can be applied to more than two alternatives by performing pairwise comparisons and eliminating the alternatives that lose out in these comparisons. In this method, the winner may depend on the order in which the pairwise comparisons are performed. Other majoritarian systems include the Amendment Procedure, the Successive Procedure, The Copeland Rule (which uses pairwise comparisons and counts losses as well as wins), and the Schwartz rule, among others.

Positional Methods utilize more information about voters' preference ordering than majoritarian methods (but not the whole ordering necessarily.) In plurality voting (also known as first past the post) every voter votes for his or her most preferred n alternatives, where n is the number of candidates to be elected. The alternatives with the most votes win. Unlike majoritarian methods, due to vote splitting in plurality voting, it is possible for two similar candidates both to lose to a third candidate that is different enough, even though it is less preferred by the overall electorate. Positional methods are particularly relevant to several preferred embodiments of the present invention, as these involve presenting a number of alternatives to the participants in the exercise, and asking them to rank the alternatives by order of preference.

In Approval voting, voters can pick as many of the alternatives as they wish (all the ones they "approve of." The winner is generally the alternative that receives a plurality of votes (more votes than the others).

In Borda Count voting, which is an example of a "scoring" or "point" method, each voter gives a number of points to each alternative, as follows: the most preferred of the n alternatives is given n-1 points, the next most preferred is given n-2 points, all the way to n—n or 0 points to the least preferred alternative. The winning alternative is the one that receives the most votes.

Multi-Stage Methods use different functions or mechanisms at different stages of the voting process; they may also use the same mechanism iteratively on a decreasing number of alternatives. One advantage of these methods is that a voter need not fear wasting his or her vote if they choose an alternative that is unlikely to win. One such method is Black's method, which selects the Condorcet winner if one exists (through successive pairwise comparisons); if a Condorcet winner cannot be found, it selects the Borda count winner. Another multi-stage method is the runoff procedure, briefly mentioned earlier, in which, absent a majority winner in the first round of balloting, a runoff simple majority election is held between the two alternatives that received the most votes. Another multi-stage method is Nanson's Borda-Elimination procedure, which applies the Borda method successively, eliminating the lowest scoring alternative at each round, until the winner remains. An advantage of this approach is that, unlike the regular Borda method, it will never pick the Condorcet loser.

Single-Transferable Voting (SVT) or Hare's procedure is popular in England. In this method, voters submit their preference ranking over all candidates. Any candidate who receives more then a threshold number of first places is elected. If the elected candidates receive more votes than are necessary for election, the excess votes they have received are redistributed over the remaining candidates based on the second-choice preferences of the voters. And again, any voter who receives more than the necessary number of votes, following the redistribution of the excess votes, is elected, and a new round of redistribution is carried out. If no more excess winning votes are available, and the necessary number of winners has not been reached, the lowest scoring candidate is eliminated and the votes for that candidates are redistributed.

There are many variations on the SVT procedure, depending on the threshold needed to win, depending on the procedure used to redistribute the freed votes, and depending on the method used to resolve ties. One method for redistributing the votes involves "controlled randomness." SVT can be used to elect only one alternative, in which case redistribution involves votes from eliminated candidates only. (This method is also known as Alternate Vote or Majority Preference.)

Coomb's procedure is similar to SVT, except that the alternatives that garner the most last places are eliminated (and their votes redistributed.) Whereas STV tends to select the most intensely liked alternative, Coomb's procedure tends to select the alternative that is least disliked by the majority.

Utilitarian Methods. Unlike the methods discussed so far, which only required the voter to provide an ordinal ranking of the alternatives, Utilitarian methods require a cardinal rating. The voters are asked to assign utility values to each of the alternatives presented to them. These utility values are intended to reflect the amount of happiness or satisfaction the voters expect to derive from each alternative, using a finite scale (commonly used scales are those that go from 1 to 5, 1 to 7, 0 to 10, or from 0 to 100.) A distinction should be made between interval scales, and ratio scales; in the former, the zero has no meaning, and it is only the difference between values that is meaningful; in the latter, the zero does mean absence of the characteristic that is being measured. The outcomes in utilitarian methods is based on the aggregation of the utility values given by the voters for the various alternatives.

To further clarify the difference between the methods presented so far and the present utilitarian methods, it has been noted that majoritarian methods base decisions on how many times x is ahead of one other alternative. Positional methods base decisions on how many times x is ahead of all other alternatives. Neither of these methods bases decision on the voters' direct valuation of the alternatives (although positional methods are sometimes mistakenly so interpreted.) Utilitarian methods account for the intensity of judgment, that is, for how much an alternative x is ahead of another alternative y. The following methods are described by Riker and Mueller.

Direct Aggregation of Cardinal Utility, such as may be used in one of the preferred embodiments described herein, is the simple Summation of Cardinal Utility method. In this method, the utility values for each alternative are added and the alternative receiving the largest sum wins. Another method involves the multiplication of utilities, where the utility values are multiplied instead of being summed. Variations on these methods involve normalizing the utility values before using them (by fitting them to some normal scale). One problem with these voting methods is the tendency voters have to inflate the utility value they assign to their favorite alternative (to increase its chances of winning), and to deflate the utility they assign to the alternatives they dislike.

One variation the invention may exploit is the case where different voters or groups or voters are given more or less voting power than others, through the use of weighting factors in the summation or the multiplication of the utilities. This amounts to a "super voter" scheme, e.g., a manager or designer could be given more voting power than others constituting the selector. Note that in the ordinal voting schemes described before, super voter status would involve giving the super voter more than one voice.

Demand-Revealing Methods. This method attempts to prevent the problem with direct aggregation discussed above, where voters inflate their valuation for their preferred outcome. The idea is to have voters vote by offering to pay a certain amount of money m in order to obtain a preferred alternative. The amounts of money offered for each alternative are summed, and the alternative that garners the largest sum wins. Voters whose offers for the winning alternative exceed the margin of victory must pay a tax equal to their contribution to the victory. The tax is not supposed to go to anyone involved in the voting system, in order not to corrupt their behavior. One downside of such a system is that the tax may not effectively deter those voters with a greater endowment of money. In the context of the invention, typically some token of value would be used; and the tax would consist of some form of penalty that may involve the tokens or something else of value to the participants in the context of the exercise.

In one aspect the invention contemplates switching of voting scheme from one system to another as the design exercise progresses. As will be apparent from the list of voting methods noted above, some are better on certain measures of fairness, such as maximizing participation, while others are better at quickly finding an alternative that potentially only a small part of the persons making up the selector feel strongly about. In other words, the voting system in use during an exercise conducted in accordance with the invention at any given point during the exercise may help exploration, for example, when exploiting the market research embodiment, or help reach rapid optimization, or convergence to a particular design favored by a person or set of person comprising the selector's representative, for example, of a particular market segment. Thus, for example, the invention can be practiced by switching between voting paradigms during the course of the exercise to help exploration early on and then drive toward a solution in a later stage. This general concept has been recognized as having value of certain standard techniques used in genetic algorithms for preventing premature convergence and allowing exploration early on. These have to do with the scaling of the fitness data that's fed back to the genetic algorithm from the evaluation function. Of course, this can be done in accordance with the practice of this invention. Alternatively, the selection and change of voting schemes are used to effectively accomplish the same thing.

Still another aspect the invention contemplates running simple voting systems in parallel and, for example, comparing the output at each generation or at assigned posts during the course of the exercise. A decision-making scheme or rule or supervisor then may decide which one to use or possibly to use some combination of their outcomes to drive the next iteration in the process. Such a decision could be based not only on the current voting data at the time the assessment is made but also on the outcomes of different vote or data aggregations schemes and voting history or earlier iterations. Of course, this technique may be used by the computer program generating the derived product alternatives. However, again, a similar result may be achieved by running several voting systems in parallel.

In step 218, the preference data as well as other parameters of the exercise (such as the time elapsed, the number of iterations run, etc.) is tested to see whether a stopping condition has been met. If a stopping condition has not yet been met, the process moves on to step 219. In this step, the genetic computation operations are performed on the population of possible solutions, in order to generate a "new" or derived population of solutions. The algorithms used at this stage may vary widely as noted above. In the preferred form, the operation is a genetic algorithm with real and integer-valued genes. The operators that are typical in most implementations of genetic and evolutionary computation include selection or reproduction operators, recombination or crossover operators, and mutation operators. Reproduction operators basically create copies of the members of the current generation of solutions as a function of their fitness. Those possible solutions that were preferred by the selector, that is, that were found by the selector to have a high degree of fitness, are more likely to be selected and reproduced than the ones that were found to be less desirable. It should be noted that most implementations of reproduction operators are not deterministic, but involve an element of randomness. In other words, it is the likelihood that a possible solution will be reproduced that varies in accordance with its fitness. It should also be noted that a highly fit solution may result in several copies of that solution showing up at this intermediate stage of reproduction.

Another operator is the crossover operator, which acts on the intermediate population of solutions that is the outcome of the reproduction operation. In crossover, members of the intermediate population are paired, and the two chromosomes of each pairing are split and the different parts cross-combined, resulting in a pair of offsprings, i.e., new pair of possible solutions. The schematic below represents the case of single point crossover.

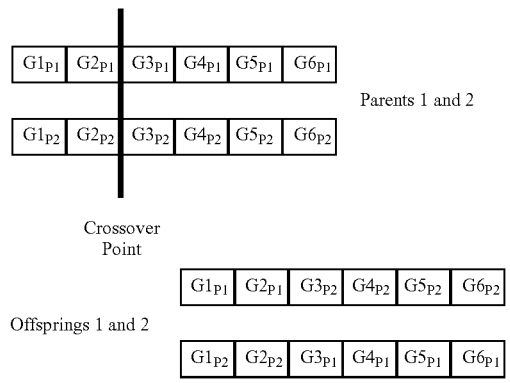

The resulting two chromosomes, following single point crossover between genes 2 and 3.

It should be noted that the pairing process could be performed at random, or it could be based on the fitness or desirability of the different chromosomes. In addition, certain schemes may pair parents according to their genetic similarity or dissimilarity (we describe a more complex assortative mating scheme later herein.) Furthermore, decision to effect a crossover operation on any given pair may involve an element of randomness. In single point crossover, the crossover location may be determined at random as well. (Some of the embodiments used in the invention, and described later, result in a single offspring for each pair of parents.)

A number of crossover operators have been developed by researchers and practitioners in the field of genetic computation; these include multipoint crossover and uniform crossover, each offering different performance (in terms of convergence, or the exploration/exploitation trade-off) under different conditions. In the case of real-valued genes, the crossover operator may involve both interpolation and extrapolation between the values of the corresponding genes in the parent chromosomes.

Following crossover, a mutation operator is applied to the offsprings, that is, the results of crossover. Mutation is a random operation intended to increase the exploration of the space of possible solutions. The implementation depends on the particular representation used. In the case where a binary valued genetic algorithm is used, the genotype consists of a string of 0' and 1's; in that case mutation involves flipping a bit (from 0 to 1, or vice versa) at random, at a given probability. For example, if the mutation rate is 0.1%, then, on average, one in every 1000 bits encountered in the population of chromosomes, one will be selected at random and flipped. In the case where a gene takes on an integer value, then, at the appropriate mutation probability (say, every one in 1000 genes on average), the integer is replaced by another one selected at random from the range of allowable values for that gene, or from a certain neighborhood of the current value of that gene.

At that point, after all genetic computations are applied to the population of possible forms or solutions, a derived population is obtained, and step 219 is effectively complete. (There may be an additional operation applied, sometimes referred to as "monster killing" whereby non-allowable chromosomes that may have been generated are eliminated and replacements generated.)

The derived population is now ready to be presented to the selector for evaluation at step 216, thus completing one iteration of the loop.

If, at block 218, one of the stopping conditions obtains, the process proceeds to block 220, which represents the end of the exercise. At 220, a preferred form or several preferred forms 221 have been found. It is possible at this point to repeat the exercise with a different selector, or with the same selector but with a different initial population of solutions, or both. It is also possible to perform a related exercise, using different attributes or different attribute ranges for the same design or decision object (i.e., step 211 is repeated to obtain different attributes, although 210 is unchanged.) This may be the case if a hierarchical design process is being undertaken, whereby one aspect of the product is designed first, then another aspect. For example, design the shape of a shoe in one phase, followed by choosing the color palette for it.

The embodiment described above is referred to as a "generational evolutionary algorithm," where a considerable percentage of the population is replaced by offsprings. Steady-state evolutionary algorithms, in contrast, typically create only one or two offspring per iteration of the algorithm. Parents are usually chosen with a stochastic process that is biased in favor of more fit individuals. Once the one or two offsprings are made, individuals from the population must be selected for removal in order to make room for the new offsprings. A great variety of removal methods exist for steady-state algorithms.

For example, the individual with the worst fitness may be replaced by an offspring. Alternatively, the member to be replaced may be chosen using a stochastic process that is biased in favor of less fit individuals. Alternatively, removal may be effected at random, such that each individual has an equal chance of being removed. Crowding methods represent yet another set of replacement schemes. In these methods, offspring replace the most similar individual from some subset of the population. Known crowding methods differ on how this subset is selected and how comparisons are made. However, because steady-state algorithms change the population contents gradually, they can provide better diversity maintenance than ordinary generational algorithms.

Figures 1, 3:
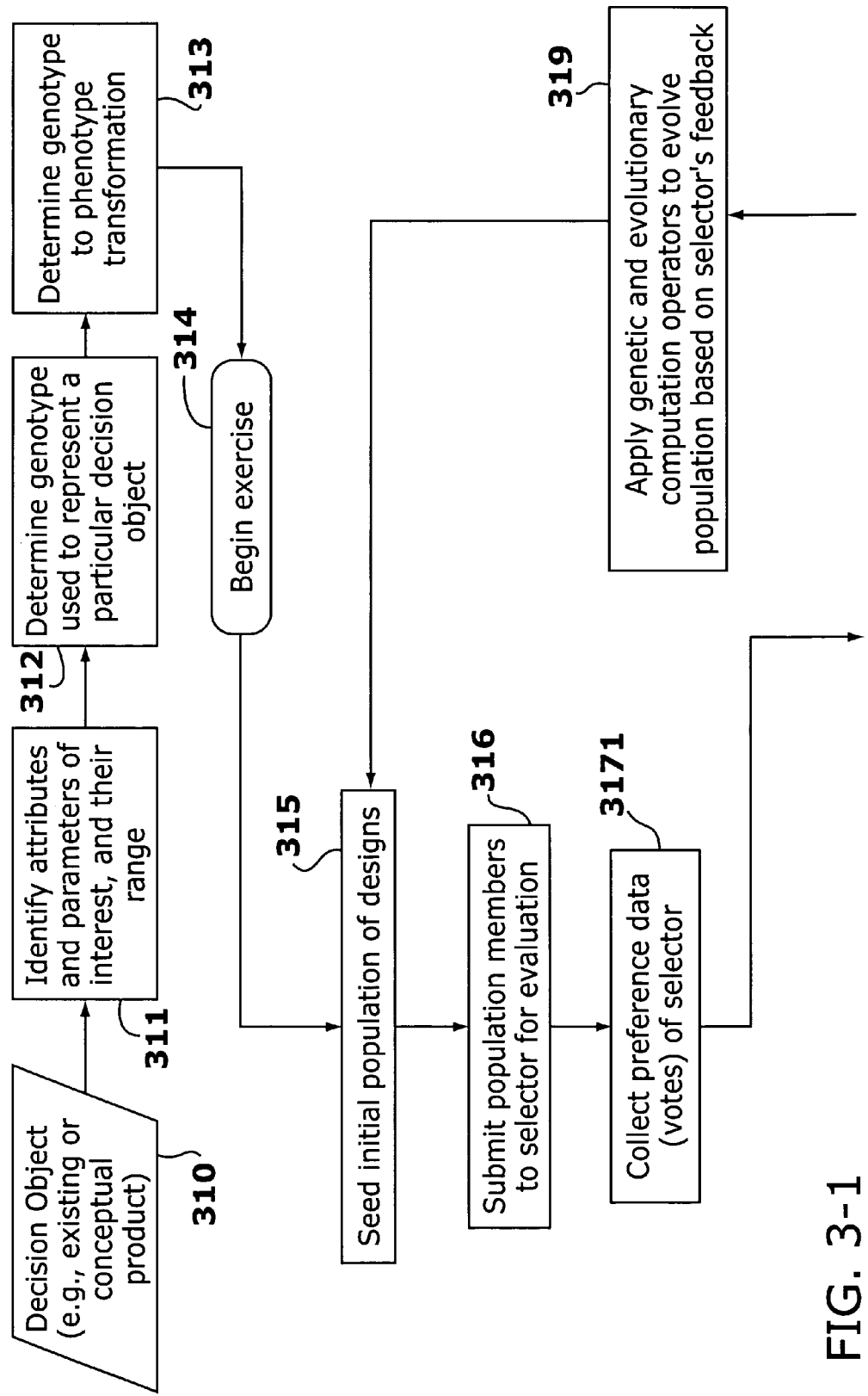
FIG. 3 is a flowchart showing one embodiment of the steps to be taken in an exercise involving a multipurpose selector entity with purchase decisions as the outcome.
Figures 2, 3:
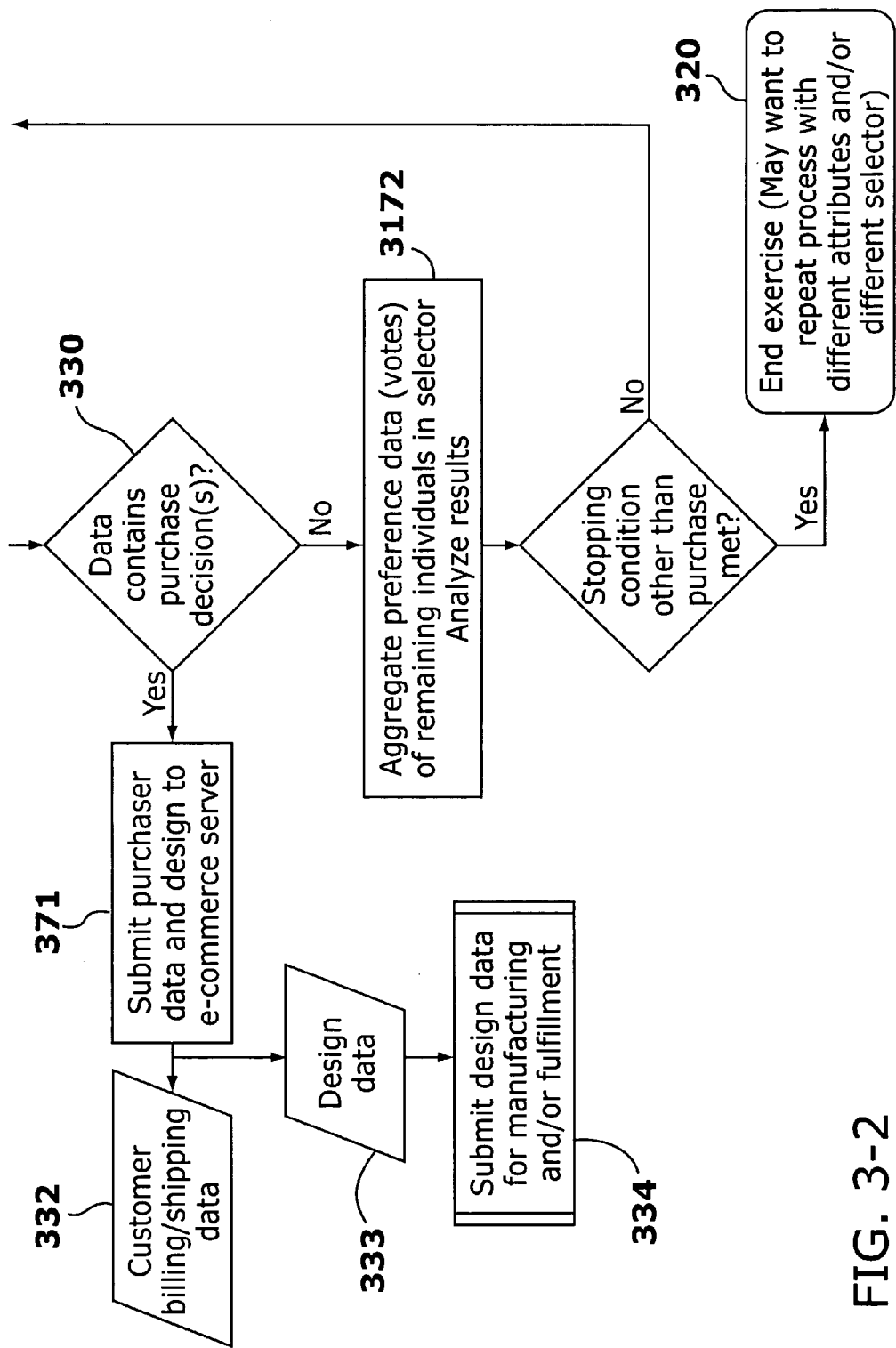

FIG. 3 represents the process flow for an example product design exercise with purchases as allowed outcomes. Blocks 310 through 316 as well as blocks 318 through 320 are the same as described previously for FIG. 2. In this embodiment of the invention, after preference data is collected from the selector in block 3171, it is checked for the presence of any purchase requests from any member of the selector for one of the product forms presented in 316. If the preference data includes such a purchase request or requests, the member of the selector, along with the information identifying the selected product form are directed to an e-commerce server where the needed shipping and billing information 332 is obtained from the individual(s). The information about the selected product form is sent forwarded in 333 to a fulfillment center, or to a manufacturing and fulfillment operation 334 that is outside the described process.

Figure 4:
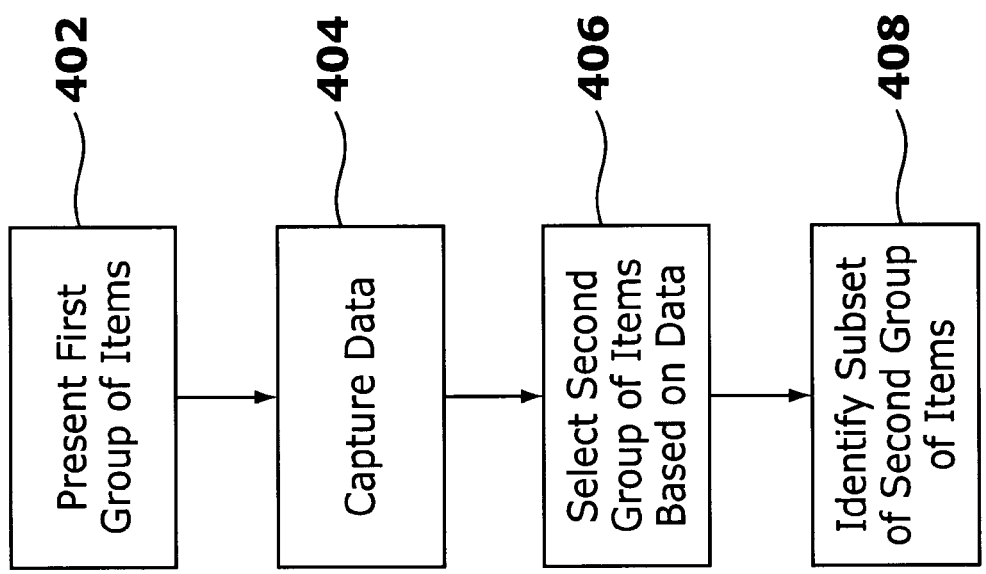
FIG. 4 is a flowchart showing one embodiment of the steps to be taken to identify market segments in an evolutionary design exercise.

Referring now to FIG. 4, and in brief overview, a method of dynamically identifying a set of items for which a plurality of selectors have a similar affinity includes the steps of: presenting for display to a group of selectors a first group of items (step 402); capturing data indicative of an item preference expressed by a least some of the group of selectors (step 404); selecting a second group of items responsive to the captured data (step 406); and identifying a subset of the second group of items having similarity among respective attributes (step 408).

Still referring to FIG. 4 and in more detail, a first group of items is presented for display to a group of selectors as described above in connection with step 216 of FIG. 2. For example, the items may be presented graphically, that is, a graphic representation such as a drawing or a photograph of the item is displayed to one or more selectors. In other embodiments, display of the items refers to the provision of a data file such as a computer-aided design (CAD) file or computer-aided manufacturing (CAM) file representing one or more items. In still other embodiments, items may be presented aurally. The items may be presented by the server computing nodes 30, 32, 34 or the client computing nodes 10, 20. Selection of items to be presented for display may be performed by the client nodes 10, 20, the server nodes 30, 32, 34, or some combination of client nodes and server nodes.

Data indicative of item preferences is captured (step 404) as described above in connection with step 217 of FIG. 2. Item preferences may be captured at each client node 10, 20 in response to the display of items in step 202. There exist many ways in which a selector may express preference across k entities of the population. The selector may rank the entities according to preference, for example, where the favorite entity (or entities, in case of a tie) receives a score of k, the next favorite a score of k-1, and so on. Alternatively, the selector may rate each entity on a scale of zero to one hundred, or merely indicate which entities are acceptable and which unacceptable. Regardless of the manner in which voter feedback is given, the feedback from all voters is subsequently appropriately scaled such that responses are directly comparable.

Scaling selector responses removes inconsistencies resulting from the case where the selector responds by rating entities on some scale (say, [0, 100]). If one selector is highly enthusiastic about all of the k entities, while another is very unenthusiastic, then the scales of the two sets of responses will not be comparable. As a result, the scores given by the enthusiastic selector will have more influence over the trajectory of the evolutionary system.

The scaling problem is solved through the use of normalization. Let $u_j^i$ be the "raw" response, or score, given by voter i to entity j. Vector $u_i$ is normalized to create vector $g_i$:

$$g_j^i = \frac{u_j^i}{\sum_{m=1}^{k} u_m^i} \text{ where } g_j^i \in [0, 1] \text{ and } \sum_j g_j^i = 1.0$$

The score of entity j is given by:

$$s_j = \sum_i g_j^i$$

Clearly, this step is unnecessary if voters respond by ranking entities, since ranking cannot produce a scaling problem. Where scaling problems do not exist, normalization may nonetheless be performed, since it does no harm to the voting data.

Assembling a second group of items responsive to the captured data (step 406) involves determining the "fitness" of the members of the population, selecting, based on fitness, a subset of the population for mating, selecting "mates" for them, and allowing the resulting parent pairs to "reproduce," as described above.

Figure 4A:
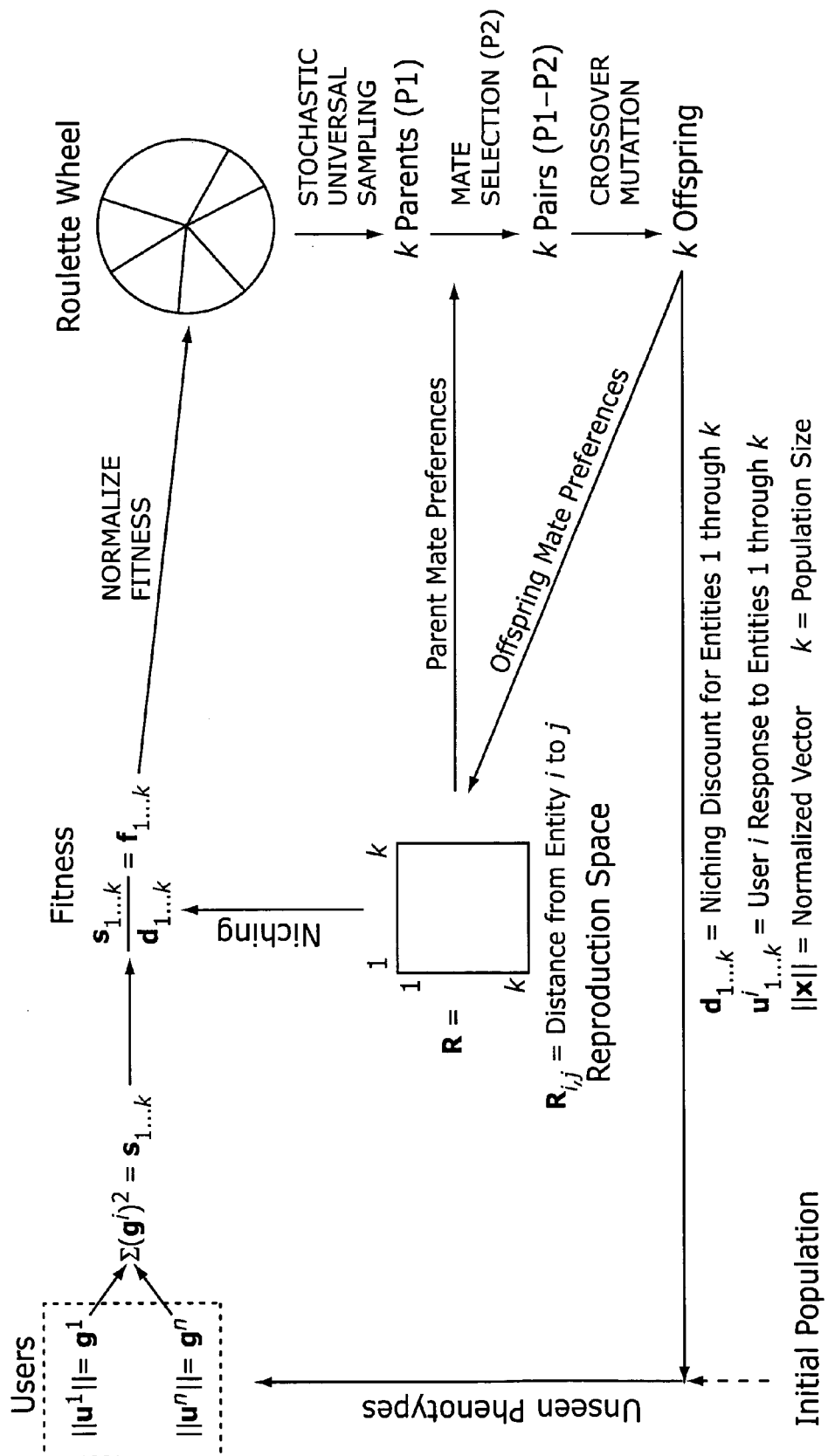
FIG. 4A is a flow diagram depicting one embodiment of evolutionary algorithm featuring speciation and niching.

As shown in FIG. 4A, the fitness $f_j$ of an entity j is defined to be its score ($s_j$ given above) divided by its niching discount. The niching discount, described in detail below, is a quantity that reflects the degree to which an entity adds redundancy to the population. By making the discount a positively correlated function of redundancy, we create a pressure to maintain genetic (and, presumably, phenotypic) diversity. Diversity maintenance is essential to successfully achieve and maintain distinct species, which can be viewed as separate preference profiles and/or market segments.

The fitness vector, f, is normalized to obtain the probabilities with which each entity will be selected to parent an offspring. Such a scheme is referred to as fitness-proportionate selection. Typically, fitness-proportionate selection is implemented by a simple "roulette wheel" algorithm, where each entity has a slice of the roulette "pie" that is proportionate in size to its probability of being selected. The wheel is "spun" once each time we wish to select a parent. If the probability of an entity being selected is p, and we spin the wheel k times, then the expected number of times the entity will be selected is pk.

This roulette wheel implementation yields a multinomial distribution. Thus, if the number of spins is large, the observed behavior will closely match the expected behavior. But if the number of spins is small, the observed behavior has a high probability of deviating from expected behavior. For any finite number k of spins, there exists a non-zero probability that an entity having probability 0<p<1.0 of being selected will be selected anywhere from zero to k times.

Baker's Stochastic Universal Sampling is an alternative to the simple roulette wheel that is shown to have better statistical properties. The roulette wheel is divided as before, but rather than a single pointer that is spun k times, k equally-spaced pointers are spun only once. If an entity has probability p of being selected, then SUS guarantees that it will be selected no less than ⌊pk⌋ times and no more than ⌈pk⌉ times. In this embodiment, the "slices" on the roulette wheel are arranged randomly. For example, if the slices were arranged such that the smallest ones (where p<1/k) were next to each other, then no two neighbors could be simultaneously selected, as one of them would necessarily fall between a pair of the k equally-spaced pointers. (Other selection methods are described in the literature.)

For embodiments using recombinative variational operators (i.e., crossover), the creation of k offspring requires k pairs of parents. Rather than use fitness information to select the mates, mating preferences are used. Each entity that evolves has a genome composed of two distinct parts. One part of the genome determines the merit traits of an entity—the characteristics that are evaluated by human voters and ultimately lead to the entity's fitness. The other part of the genome determines the reproductive traits of an entity—the characteristics that express the entity's mating preferences. Reproductive traits do not affect an entity's fitness.

The precise structure of an entity's merit traits—the types and ranges of allele values—is domain dependent. In contrast, reproductive traits are defined to be real numbers and are not limited to fall into a particular range. All entities have the same number of reproductive traits—q real-valued genes. We interpret an entity's q reproductive traits as a point in q-dimensional Euclidean space. An entity prefers to mate with other entities that are closer to it in this q-dimensional "reproduction" space than those that are farther.

Figure 4B:
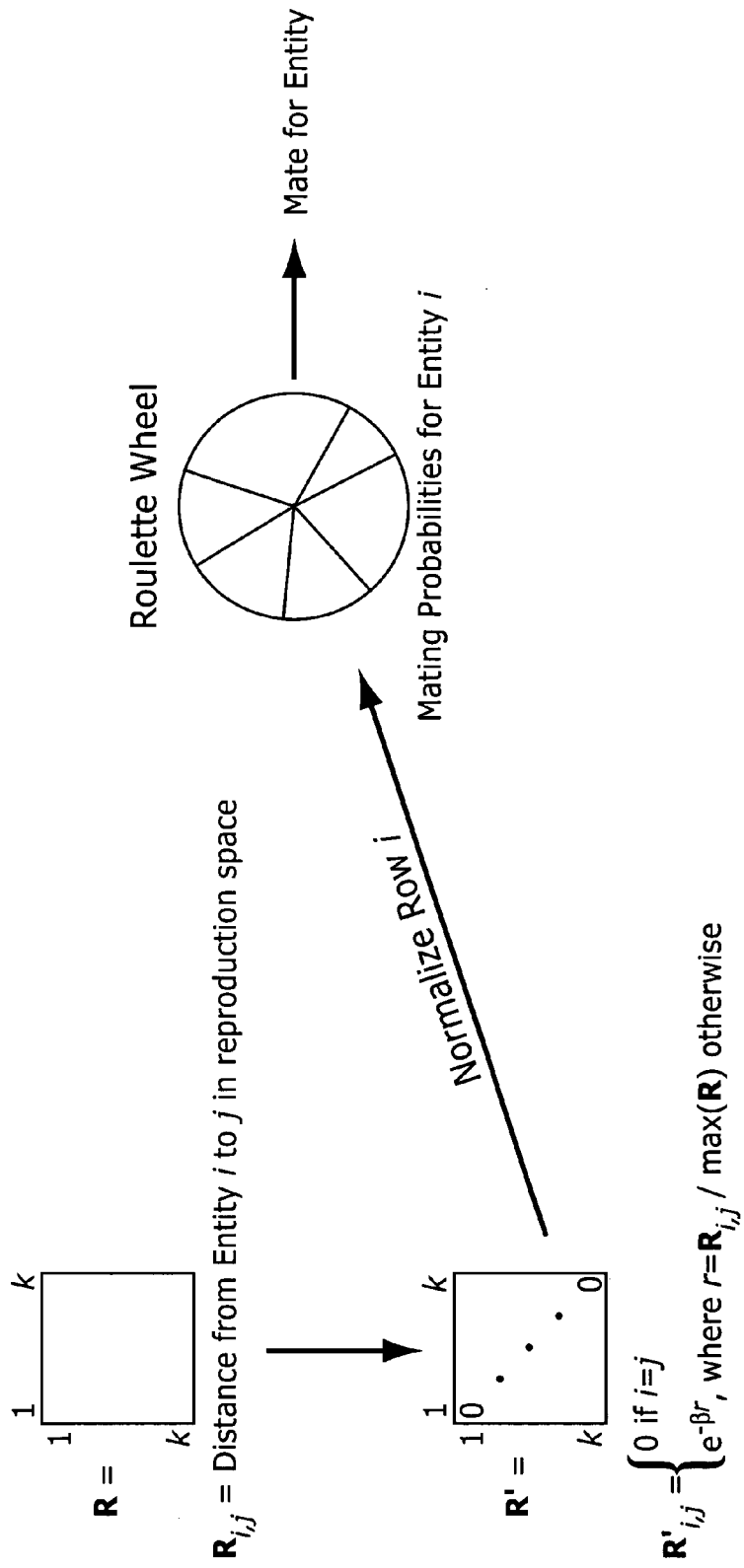
FIG. 4B is a flow diagram depicting one embodiment of the steps to be taken to compute mating probabilities.

FIG. 4B details how an entity picks a mate. A symmetric matrix R is computed where entry $R_{ij}$ is the Euclidean distance between entities i and j. Our next step in computing mating preference is to derive matrix R' from R, as defined below. The larger the value of entry $R'_{ij}$, the more entity i is willing to mate with entity j. An entity may not mate with itself, so the diagonal is composed of zeros. Specifically, the willingness for entity i to mate with entity j is:

$$R'ij = \begin{cases} 0 & \text{if } i = j \\ e^{-\beta r} & \text{otherwise} \end{cases} \text{ where } r = \frac{R_{ij}}{\max(R)}$$

Thus, willingness to mate drops exponentially with Euclidean distance. This drop may be scaled using a coefficient, β. If β=0, then the entities have no mating preferences and will mate randomly (though self-mating will still not occur.) If entity i has been selected because of its fitness, we pick a mate for it by normalizing row i of matrix R' to obtain probabilities of mate selection. These probabilities are used to construct a roulette wheel, which is spun once to select a desired mate. This process is repeated for every entity seeking a mate.

In this implementation, when two parent entities mate, a single offspring is produced. The recombination operators applied to merit traits are dependent upon the types and ranges of allele values allowed, and thus vary from domain to domain. The recombination operator applied to the parents' reproduction traits computes the arithmetic mean of their locations in reproduction space—the offspring is located midway between its parents in reproduction space. In one embodiment, after the offspring's location is computed, as small amount of Gaussian noise is added. In one particular embodiment, the added noise has a mean of zero and standard deviation of 2.0.

As discussed above, an entity's fitness is defined to be its score divided by a discount factor that correlates to the amount of redundancy the entity brings to the population. While genotypic similarity is generally easy to measure, it is not necessarily an accurate predictor of phenotypic similarity, which is the space in which diversity is sought. Further, phenotypic similarity can be very difficult or impossible to determine, depending upon the nature of the problem domain and genotype-phenotype mapping. A species may be defined as a group of entities that is reproductively isolated from other groups of entities; entities within a species can reproduce with each other. The speciation process is driven by use feedback. If the collection of human aesthetic opinions clusters into two incompatible groups of designs, such that no entity belonging to the first group can produce a viable (high fitness) offspring by mating with an entity belonging to the second group, then two species will form. Niching facilitates the speciation process and allows species to more stably persist. Therefore, we can compute the redundancy an entity brings to the population by measuring its proximity to other entities in reproduction space. If one species begins to overpopulate the population, its members will begin to receive larger discounts than entities that belong to other (smaller sized) species. (An alternative embodiment, described later, uses genotypic similarity as the basis for computing the fitness discount.)

Figure 4C:
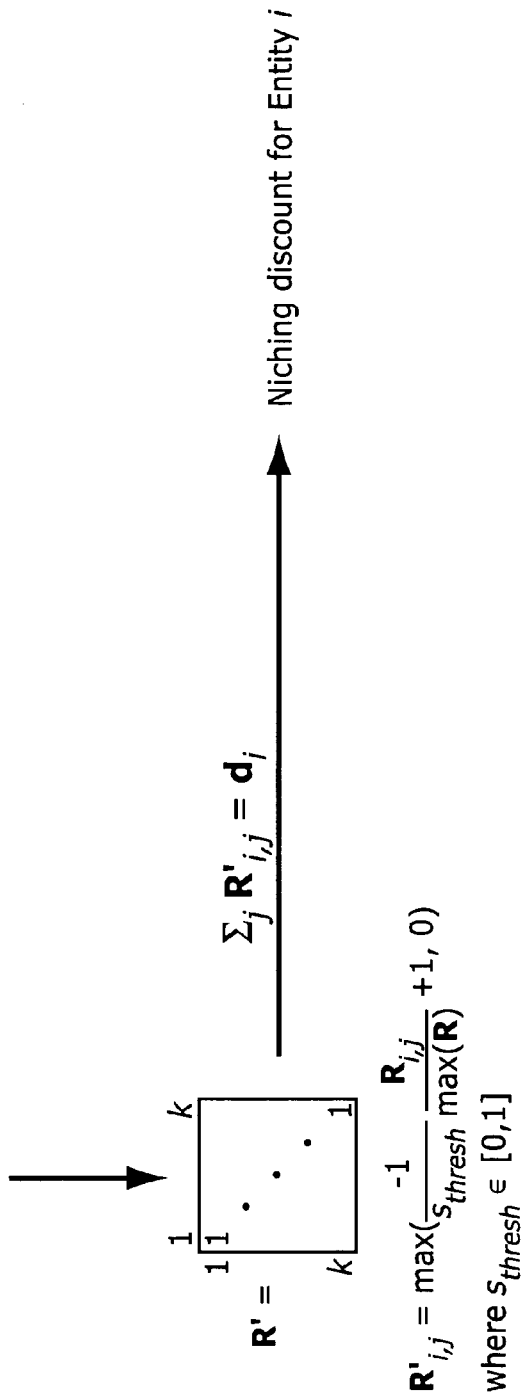
FIG. 4C is a flow diagram depicting one embodiment of the steps to be taken to compute and entities niching discount.

FIG. 4C shows how the niching discount is computed. As with the mate selection procedure, we begin with a matrix R where entry $R_{ij}$ is the Euclidean distance between entities i and j in reproduction space. From this matrix we derive matrix R' where entry $R'_{ij}$ signifies the amount of discount generated with respect to entity j to be applied to entity i. Given our similarity metric, we use a triangular method of computing similarity-based discounts:

$$R'_{ij} = \max\left(\frac{-1}{s_{threshold}} \frac{R_{i,j}}{\max(R)} + 1, 0\right)$$

where $s_{threshold} \in [0,1]$ is a parameter that determines the minimal amount of similarity (or, maximal amount of dissimilarity) that will generate some amount of discount. Larger values of $s_{threshold}$ decreases the minimal amount of similarity between entities i and j needed to generate a non-zero discount.

In another embodiment of the invention, participants are recruited or invited to participate in the design or market research exercise using any number of methods. These could include, but would not be limited to, postal or electronic mail invitations, telephone calls, print or electronic advertisements, or word of mouth. These participants would be selected based on any number of factors or none at all, such factors including, but not limited to, belonging to particular user groups, fan clubs, demographic groups, organizations, etc. A selected subgroup would be directed to a location, which could be a physical location where one or more computer terminals would be set up for the participants to interact with, or to a Uniform Resource Locator address (URL) over the internet. Each participant would either be pre-registered or would be asked to sign up to participate in the exercise, through a dialogue page 500 similar to the one shown in FIG. 5. At that point, additional information may be collected about the participant, such as demographic or preference information, which may be used subsequently, either during the exercise to bias the choices presented to that particular participant, or in analyzing the data obtained during the exercise, and in presenting those results at the end of the exercise. In the embodiment shown in FIG. 5, a user's e-mail address, desired password, and zip code are entered in text entry boxes 502, 504, 506. Demographic information such as gender, age, country of origin and income range are entered using pull-down menus 510, 512, 514, 516. Other information is entered using check boxes 520, 522, 524. Other graphical user interface techniques may be used, such as radio buttons and sliders.

Figure 6:
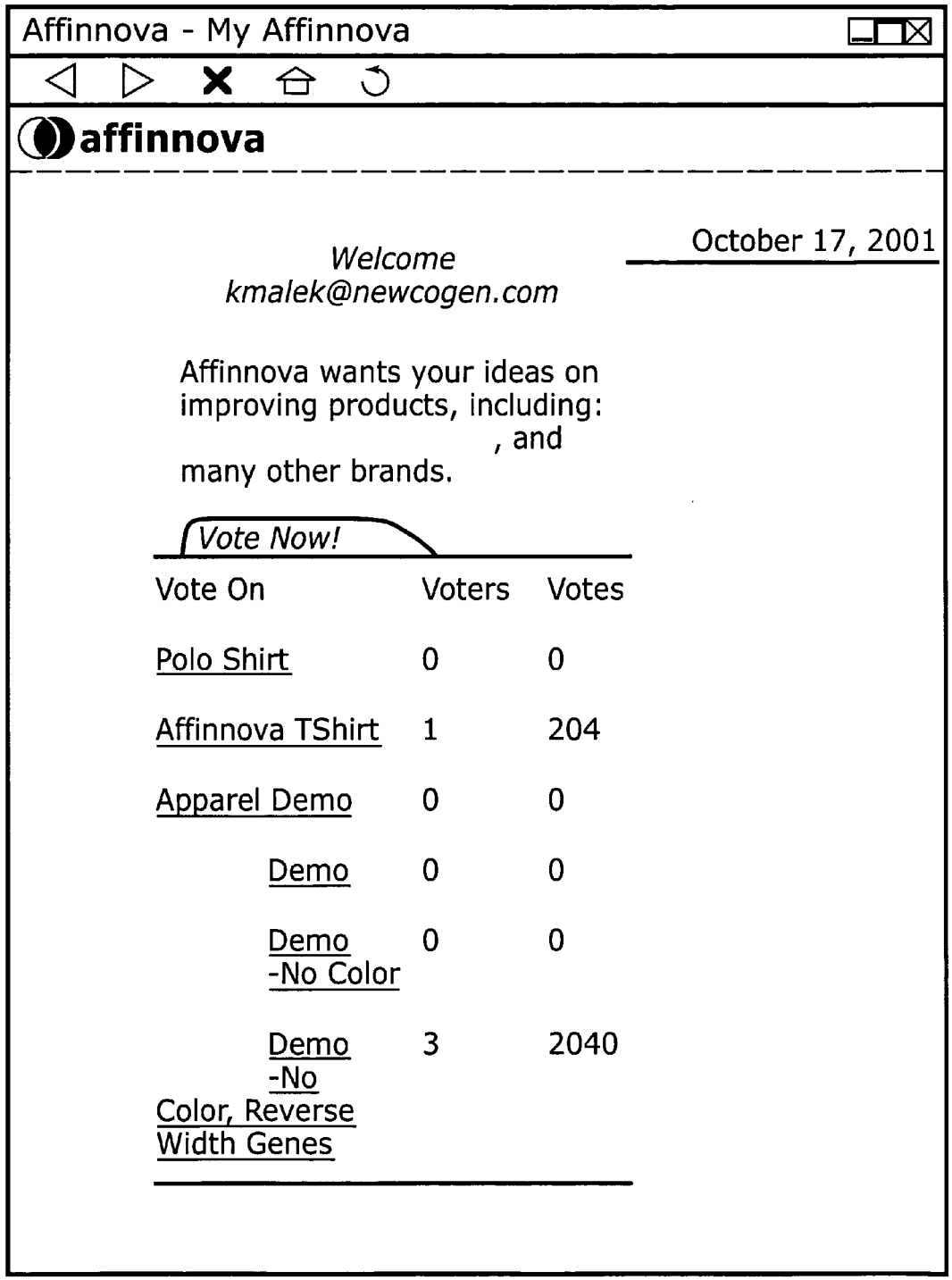
FIG. 6 is a screenshot depicting one embodiment of a dialogue screen useful in connection with the invention.

After the preliminaries described in the previous paragraph, the participant is led to the exercise. In some cases, there may be more than one exercise in which the person has been invited to participate; in those cases, the participant is led to the different exercises, either in a controlled or prespecified fashion, or through a dialogue screen that allows the participant to select the exercise he or she wishes to work on. FIG. 6 shows such a dialogue. In the embodiment shown in FIG. 6, three design exercises are presented to the user: a polo shirt design exercise; a tee shirt design exercise, and a "demo" exercise.

Figure 7:
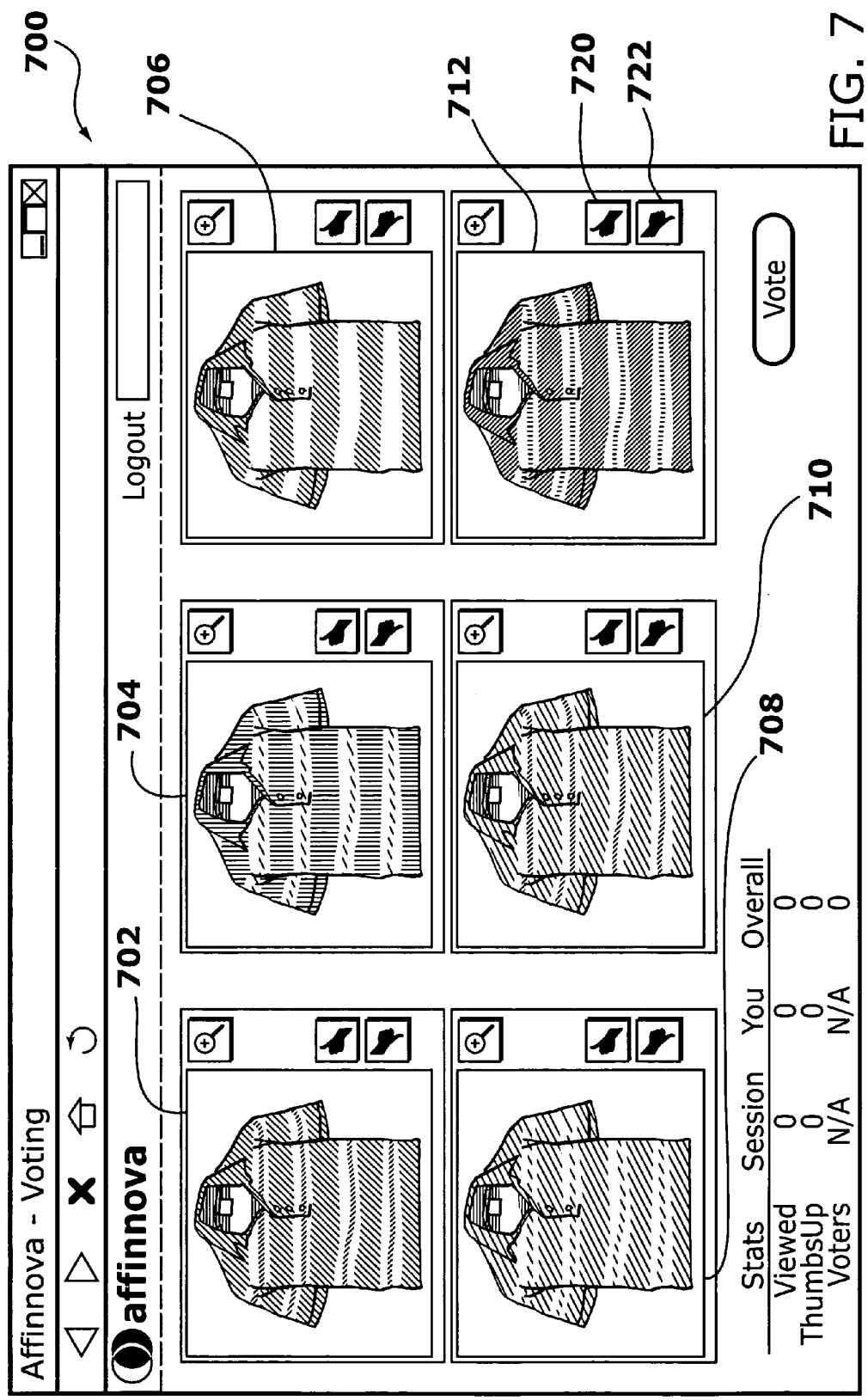
FIG. 7 is a screenshot depicting one embodiment of a screen useful for receiving user input.
Figure 7A:
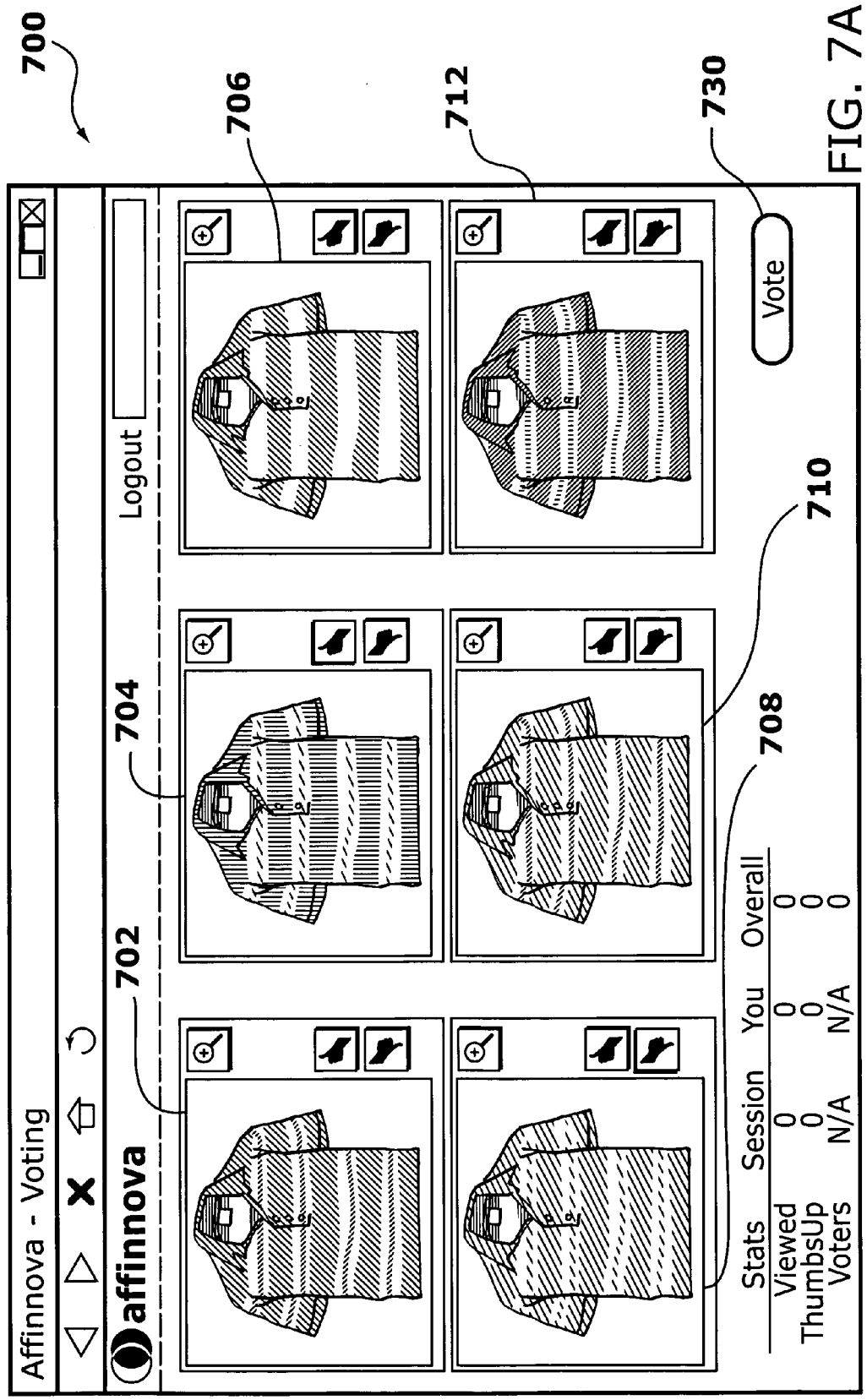
FIG. 7A is a screenshot depicting a particular preference assessment prior to vote submission
Figure 7B:
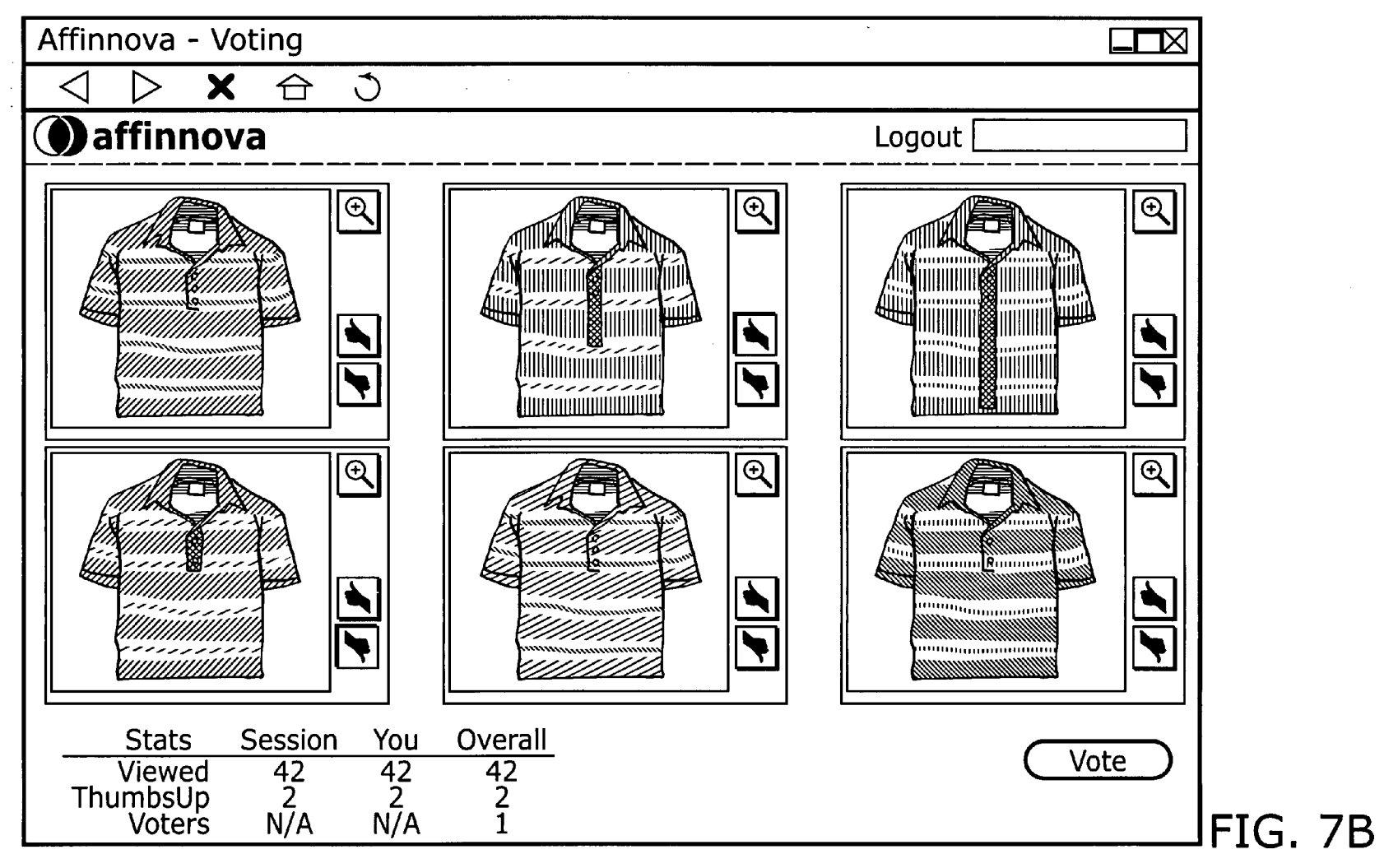

FIG. 7 shows a typical screen 700 that would be seen by a participant once he or she reaches the exercise proper. Such a screen presents the participant with a number of alternative choices for the design (or decision) object 702, 704, 706, 708, 710, 712. In this figure, the design object is a polo shirt, and the number of alternatives presented in this particular screen is six. Next to each design alternative, a "thumbs up" 720 and a "thumbs down" 722 button are provided as means for the participant (also referred to as "voter") to express their opinion about the design alternative in question. FIG. 7A shows the same screen after the participant has given the design alternative 704 a positive vote, and design alternative 708 a negative vote. In some embodiments, green and red borders may be used as a visual feedback mechanism to remind the participant of their assessment for the corresponding alternatives. In this figure, the remaining four design alternatives 702, 706, 710, 712 have received neither a positive nor a negative assessment, meaning that the participant is neutral or ambivalent towards them, neither liking nor disliking them. Once the participant has input his or her assessments, votes are submitted by clicking on the "Vote" button 730. This results in a new set of design alternatives being presented for assessment to the participant, triggering a new iteration in the process described above. FIG. 7B shows a screen containing one such set of derived alternative designs. In the particular implementation described in this section, the assessment or voting information provided by the participant at each iteration is used in a number of ways, which are described below. Before that however, the next paragraph describes the particular product featurization used in this example.

The design object used in this exercise represents one particular product featurization. A polo shirt could be featurized in an infinite number of ways. In this particular example, a simplified featurization is used, consisting of the following design elements: the color of the body of the shirt, the style and color of the collar, and in the case of a particular collar type—the tab collar—the length of the tab. Each of these design elements or design attributes can take on any of a set of values. In the case of the body color, there could be, for example twelve discrete colors. In the case of the collars, there could be, for example four possible styles, each of which has a fixed color. Finally, in the case of the tab collar, the tab length could take on any real numeric value within a specified range (which is chosen so that the tab length cannot exceed the length of the body of the shirt.) A specific design candidate corresponds to a particular triplet of body color, collar style, and collar tab length (although the latter value may go unused if not needed.)

Evolutionary Algorithm

In this particular embodiment, an evolutionary algorithm is used to evolve the designs towards ones that are more fit, that is, to generate designs that are more in line with the preferences expressed by the voters. The genotype used to represent each design candidate consists of variables or genes representing the three design attributes described in the previous paragraph, along with additional variables that are used to control the way in which different design candidates are selected for mating (an operation, described in more detail below, in which attributes from two "parent" designs are combined to generate a new "offspring" design.) The first set of genes, G1, G2, and G3, are referred to as the "merit" genes or variables (also, "feature" genes or "attribute" genes), since they are directly responsible for determining what a design candidate looks like, and therefore the degree of approval it gets. The second set of genes are hidden, in the sense that the way in which a design candidate looks to the participant is unaffected by the value of these genes. These genes are referred to as "reproduction" genes or variables, for the role they play in mating and mate selection, as described later. In this particular implementation, these genes are real-valued and they represent the orthogonal dimensions of a Euclidean space, referred to as the "reproduction" space. Table 1 below represents the genotype for the polo shirt exercise under discussion. In this case two reproduction genes, R1 and R2, are used.

TABLE 1

Schematic representation of genotype

| G1 (Collar Style) | G2 (Body Style) | G3 (Collar tab length) | R1 (Reproduction variable 1) | R2 (Reproduction variable 2) |
| --- | --- | --- | --- | --- |

The evolutionary algorithm is a population-based search and optimization algorithm. In the present embodiment, the algorithm works with a population of designs of size N, where N typically ranges from 50 to several hundred. At the start of the exercise, this population is seeded at random, that is, by selecting allele values at random for each gene from the allowed range for that gene. Alternatively, the current embodiment allows for deterministic seeding, in order to reflect a particular desired starting population.

Breeding

Mate Selection

When a participant submits a vote after assessing a first screen of candidates, the information is used to generate new designs and to populate the subsequent screen that is presented to him or her, based on the following procedure. Every design candidate in the first screen that received a thumbs-up vote is immediately selected for breeding; in other words, it selected to be a parent, call it P1. Next, a suitable mate is selected for it from among the larger population of designs. That mate becomes parent P2. If less than half of the displayed candidates receive thumbs ups, the current implementation can be, and usually is, set so that each of the selected candidates is bred twice. In this particular embodiment, mate selection is done stochastically based on the Euclidean distance in reproduction space between P1 and all other members of the population at that point in time. More specifically, the probability that any of the N-1 members of the population (or "entities") will be selected as a mate for P1 is computed based on the following formula:

$$Pr(j \mid i) = \frac{f(d_{ij})}{\sum_{j \neq i} f(d_{ij})}$$

where Pr(j|i) is the probability that entity j will be selected as a mate for entity i (with Pr(i|i)=0) and where $f(d_{ij})$ is a function of the Euclidean distance between entities j and i in the reproduction space, i.e.:

$$d_{ij} = \sqrt{(R1_i - R1_j)^2 + (R2_i - R2_j)^2}$$

The particular function used in this case decreases monotonically with distance; specifically:

$$f(d_{ij}) = e^{-\beta(d_n/d_{max})}$$

where $\beta$ is a real valued parameter that determines the strength of proximity bias in mating, and $d_{max}$ is the maximum distance in reproduction space between any two entities at that point in time:

$$d_{max} = \MAX_{i,j}(d_{ij})$$

The value of $\beta$ is in the range $[0, \infty)$, where a value of zero results in no mating bias and larger values give an increasingly more restrictive mating bias.

Another version of function $\theta(d_{ij})$, also used in this embodiment, is given by:

$$f(d_{ij}) = \frac{1}{\sqrt{\gamma\pi}} e^{\frac{-d_{ij}^2}{\gamma}}$$

In this case, $\gamma$ is a real valued parameter that determines the strength of distance bias in mating. The value of $\gamma$ is in the range $(0, \infty)$, where smaller numbers give an increasingly more restrictive mating bias.

The distance-weighted probabilities thus computed are used to load a "roulette wheel", or are used in a Stochastic Universal Sampling scheme. Once a mate is selected for P1, that entity becomes the second parent, P2, for the offspring about to be created. This is done through a crossover operation, optionally followed by a mutation operation.

In one alternative method for mate selection a genetic algorithm is used in which the bit string representation includes a set of functional genes (which correspond to our feature genes) and two other sets of genes that control mating (which correspond to our reproduction genes). One set of mating genes is called a mating template and the other set is called a tag. Both sets must have the same number of genes. The template and tag genes evolve along side the functional genes and are subject to crossover and mutation. A template gene can take on one of three values: 0, 1, or a wild-card symbol. A tag gene will be either a 0 or 1. Two individuals are allowed to mate if the template of one matches the tag of the other. If a 0 or 1 is specified for a particular template gene of one individual, then the same value must appear in the corresponding tag gene of the other individual. If the wild-card appears in a particular template gene, then any value of the corresponding tag gene will match. One mating scheme requires that the template of one individual match the tag of the other; an alternative scheme requires that each individual's template match the tag of the other for mating to occur. In either case, if no matches are found, partial matches may be allowed.

Generally, the idea of R-space is to prevent inter-breeding between distinct clusters of designs. Nevertheless, occasional experiments with inter-breeding can lead to important innovations. The dimensionality of R-space affects the neighborhood structure between clusters, and therefore the ease with which different clusters may attempt inter-breeding experiments. One obvious modification is to increase the dimensionality of the R-space from two to a higher number. Another possibility is to interbreed two designs that have received a thumbs-up from the same voter, perhaps within the same focus window. Such inter-breeding will create a small bridge in R-space between the two R-space regions where the parent designs are located. If the inter-breeding experiment is successful, then a new cluster will form. If the experiment is unsuccessful, then the offspring will become extinct.

An Alternative to R-Space

An alternative embodiment of the present invention may include an assortative mating mechanism that determines mate selection based upon genealogical distance, as opposed to the R-space distance scheme described above. Specifically, the likelihood of two individuals $P_i$ and $P_j$ mating is related to the length of the shortest path that connects them in the "family tree." Individuals in the initial population are considered siblings, that is, we assume the existence of a "primary" parent that creates the initial population. The family tree is represented as a graph, where vertices correspond to individuals, and edges represent parent/child relations. Thus, an edge will exist between two individuals if and only if one of them is a parent of the other. Each individual records the identities of its parents, of which there are exactly two, so the graph is easily constructed. The only exception to this rule applies to individuals in the initial population, which all have an edge to a single parent vertex (the "primary" parent) that is inserted into the graph. The distance $d_{ij}$ between two individuals $P_i$ and $P_j$ (neither of which are the "primary" vertex) is the length of the shortest path between them on the graph. In the current implementation, the length of a path is measured by the number of distinct edges (or parent-child relationships) traversed to go from one individual to the other individual (as opposed to the Euclidian distance which is used in the R-space implementation described earlier.)

The probability of individual $P_j$ being selected as a mate for $P_i$ is:

$$Pr(j \mid i) = \frac{f(d_{ij})}{\sum_j f(d_{ij})} \quad (6)$$

where:

$$f(d_{ij}) = \max(d_{max} - d_{ij}, v_{min}) \quad (7)$$

and where $d_{ij}$ is the length of the shortest path connecting vertices $p_i$ and $p_j$, $d_{max}$ is the maximum over all $d_{ij}$ (also known as the diameter of the graph), and $v_{min}$ (a parameter $<d_{max}$) is the minimal value that function $f$ will return, to provide a non-zero minimum probability of mating for individual designs that are very far from each other.

Over time, the weaker branches of the family tree become extinct, leaving other branches that may possibly be distantly related. If so, then the different branches are reproductively isolated and therefore distinct species. The branches that go extinct are genetic combinations that are poor relative to the genetic combinations that survive. Thus, this method provides another approach to assortative mating.

Crossover operations are represented schematically below:

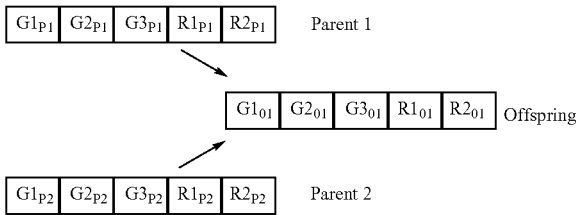

In the implementation described here, the parent genomes are crossed on a gene-by-gene basis. In other words, the genes for the body style, G1, from parent P1 and parent P2 are "combined" or "crossed" by themselves, followed by the G2 genes representing the collar style, then the G3 genes representing tab length. The reproduction space genes, R1 and R2 are also crossed, again individually. The particular cross-over operation used depends on the nature of the gene in question. For example, in the case of gene G1, which represents a categorical variable, the allele value from one of the parents is selected at random. Similarly for gene G2. This is shown schematically below:

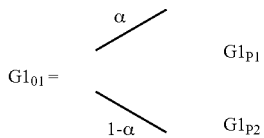

Where α is a random variable picked from a uniform distribution:

$$\alpha \sim U[0,1]$$

Gene G3 represents an integer value, which makes it possible to use different crossover operators, as an alternative to the "random pick from one parent" scheme. One possibility is to compute interpolated and extrapolated values using the two values from the parents, and then to select one of these two possibilities at random. The process is described below. First, a Bernoulli trial (a "coin flip") is performed to decide whether to interpolate of extrapolate a value for the offspring gene, from the two values of parent genes.

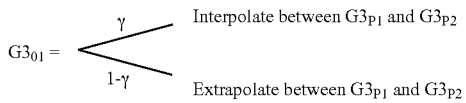

Where γ is either a deterministic real value between 0 and 1, or a randomly generated variable within that range, for example one from a uniform distribution:

$$\gamma \in (0,1)$$

or $$\gamma \sim U[0,1]$$

If the decision is interpolation, a formula such as the one below is used:

$$G3_{O1} = \text{Round}(\mu \cdot G3_{P1} + (1-\mu) \cdot G3_{P2})$$

where μ is a real value between 0 and 1, either selected deterministically or drawn at random, at the beginning of an exercise, or at every breeding. Alternatively, different deterministic values or different distributions (in the case of variables drawn randomly) could be used at different points in the exercise. Since G3 is an integer gene, the value obtained by interpolation is rounded to the nearest integer.

If extrapolation is selected instead of interpolation, one of parent values is picked to determine the direction of such extrapolation; this is done at random. If P1's is picked, then a formula like the following one can be used:

$$G3_{O1} = \text{Round}(\nu \cdot ((1+\mu) \cdot G3_{P1} - \mu \cdot G3_{P2}))$$

where ν is a (possibly random) real valued parameter, typically less than 1.0, chosen to scale down the size of the extrapolation step taken. An additional step not reflected in the formula above involves checking that the value thus computed does not exceed the allowable range for gene G3, and setting it equal to that limit if it does.

If P2 is picked as the extrapolation direction, then the following can be used:

$$G3_{O1} = \text{Round}(\nu \cdot ((1+\mu) \cdot G3_{P2} - \mu \cdot G3_{P1}))$$

The reproduction space genes, R1 and R2, being real-valued, can be treated similarly, except that the rounding operation is not needed. In the present implementation, a modified averaging operation is used, as follows:

$$R1_{O1} = \frac{1}{2} \cdot (R1_{P1} + R1_{P2}) + \varepsilon$$

where ε is a Gaussian noise:

$$\varepsilon \sim N(0,2)$$

The calculation of $R2_{O2}$ proceeds similarly.

Many other schemes are within the knowledge of those of ordinary skill in the art.

Mutation

In addition to the crossover operation, or concurrent with it, a mutation operation is applied, to introduce occasional random variation in the design candidates that are generated. In the current implementation, this is done on a gene-by-gene basis again. For each gene, a determination is made, either before of following the crossover operation, as to whether a mutation is going to be applied. This is based on Bernoulli trial with a relatively low probability of success, around 0.01 typically. In the case of categorical genes, the mutation involves selecting, at random, one of the allowable allele values, typically a value that is different from those of the two parents. In the case of integer and real-valued genes, a Gaussian noise is added to the gene value obtained after the crossover operation is complete. Again, a check is performed to make sure that the mutated value is within the allowable range; if it falls outside that range, it is set equal to the upper or lower limit, as appropriate. Another case, not used in this example (the polo shirt) is where a gene is encoded as a binary bit or string. An example would be a design feature such as a logo or rings around the sleeves, which are turned on or off, depending on whether that bit is enabled or not. In that case, a mutation would simply involve a bit flip.

Mutation, as described so far, is only applied after a breeding event, and a breeding event is only triggered by a thumbs-up vote. A refinement to the implementation is triggered when no thumbs-up votes are generated, to prevent the evolutionary process from stagnating. In that case, we generate some number of random individuals every time a voter submits a set of votes that contain no thumbs-up. The merit attributes for these random individuals are generated as described above for initializing the population. The R-space attributes for these random individuals are determined as described below, in the section that discusses re-insertion of voter "picks".

Replacement/Removal Policies

Once one or more new design candidates (the offsprings) are created, they are introduced into the population. In order to do that, a corresponding number of current members of the population must be selected for replacement. Various strategies are employed for that purpose, ranging from purely random selection, to relatively intricate schemes based on fitness (or lack thereof) and redundancy. (Various ways used to measure redundancy and diversity are described later.) In the simple case, a population member is chosen at random: a random integer i uniformly distributed between 1 and N (the size of the population of design candidates) is generated, and the $i^{th}$ member of the population is removed and replaced by the offspring. This is repeated as many times as the number of offsprings created by a mating event. Another option in the current implementation is to bias the removal by fitness, or rather, lack of fitness. In that case, a misfitness score is maintained for each member of the population, and that score is either used deterministically to remove the member(s) with the highest misfitness score(s), or stochastically by loading a "roulette wheel" with slices proportional to these misfitness scores. A very simple algorithm for computing misfitness scores, one which only relies on "thumbs-up" votes, is the following. First, any members of the population of N designs that have not been assessed yet, and that therefore have received no votes, are set aside and are not candidates for removal. This is to avoid the premature loss of design candidates, unless absolutely needed (at which point we pick uniformly at random). Next, for each of the remaining members of the population, the rate of "thumbs-ups" is computed as the ratio of "thumbs-up" votes received by that entity divided by the total number of votes received by it (i.e., the sum of "thumbs-up", "thumbs-down", and "neutral" votes.) Next, the average rate of "thumbs-up" for all members of the population is computed, and the population of designs is divided into two groups, those that have a "thumbs-up" rate greater then average, and those that have a rate equal to or lower than the average rate. Members of the latter group are selected at random for removal, as needed.

A more discriminating removal scheme that uses all three types of votes—thumbs-up, neutral, and thumbs-down—is sometimes used in the current implementation. In that case, the misfitness $m_i$ for the $i^{th}$ member of the population is computed as a weighted sum of that member's thumbs-up, neutral, and thumbs-down rates, as follows:

$$m_i = w^{down} \cdot R_i^{down} + w^{neutral} \cdot R_i^{neutral} + w^{up} \cdot R_i^{up}$$

where the $w^{type}$ terms are the weights for the particular type of vote, and $R_i^{type}$ terms are the vote rates of the given type for the $i^{th}$ member, with $w^{down}>0$, $w^{up}<0$, and $w^{neutral}$ generally positive. For example:

$$m_i = 3 \cdot R_i^{down} + 1 \cdot R_i^{neutral} - 4 \cdot R_i^{up}$$

Again, design candidates that have not been seen by any of the participants are set aside, to prevent their premature elimination (unless absolutely necessary, for example in some cases early on in an exercise.)

Another variation on the removal policy modifies the contribution to the misfitness rating of similar votes, based on whether they were all cast by the same participant or by different participants. The idea behind this version is to penalize a design candidate more if it disliked by a number of different participants, that is, if different participants gave it thumbs-down for example, as compared to when it gets the same number of thumbs-down from only one participant. In this version, the individual votes for each entity are tracked, and the misfitness is computed based on declining weighting function or schedule for each participant's votes, as in the equation that follows:

$$m_i = \frac{1}{V_i} \left[ w^{down} \cdot \sum_j \sum_{n=1}^{V_{i,j}^{down}} e^{-\gamma(n-1)} + w^{neutral} \cdot \sum_j \sum_{n=1}^{V_{i,j}^{neutral}} e^{-\gamma(n-1)} + w^{up} \cdot \sum_j \sum_{n=1}^{V_{i,j}^{up}} e^{-\gamma(n-1)} \right]$$

where $m_i$ is the misfitness score of entity i, $V_i$ is the total number of votes received up to that point by entity i, $V_{i,j}^{type}$ is the number of votes of the given type cast by voter j for element i, $$\sum_j$$

represents the summation over all voters j, and $\gamma$ is a real parameter that determines the steepness of an exponentially decreasing weighting function that reduces the impact of additional votes cast by the same participant.

Another class of removal schemes take into account how redundant a particular member of the population is, in addition to its misfitness. The idea here is the following: given two entities that are equally unfit, it is preferable to remove the one that is genotypically similar to many other members of the population, in order to minimize the loss of genotypic diversity in the population. The redundancy computation can be based either on the reproduction genes, the feature genes, or both. These computations are described in the next section. Given a redundancy value $R(P_i)$ for a member of the population $P_i$, its adjusted misfitness value $m'_i$ is computed, as:

$$m'_i = R(P_i) \cdot m_i$$

The next section describes various ways of measuring redundancy, or its opposite, diversity.

Diversity Measurement

Diversity measurement techniques are applied to both feature genes as well as reproduction genes. We use measures of diversity to dynamically control various parameters of the evolutionary algorithm, such as the mutation rate (mutation probability), as well as various strategies used in the system, such as the removal (or replacement) strategy and the strategies used to populate a participant's voting window (which are described later.)

Redundancy

Diversity in the evolving population of N designs is measured using a metric of genotypic (or phenotypic) similarity between pairs of evolving designs ("individuals"). A pair-wise similarity metric $S(P_i, P_j)$ is defined, which returns a value between 0 and 1, where 1 signifies that $P_i$ and $P_j$ are genotypically (or, alternatively, phenotypically) identical. We then use this metric to compute the redundancy of each individual in the evolving population with respect to the population as a whole, as follows:

$$R(P_i) = \sum_{j=1}^{N} S(P_i, P_j)$$

An individual with a high redundancy value is relatively common, in the sense that there exist many other individuals in the population that are similar to it. These redundancy values are used to help maintain diversity by biasing removal policies towards more redundant individuals, as explained in more detail below. Redundancy values are also used to provide a graphical visualization of genetic (or phenotypic) diversity.

Two similarity functions are used in the current implementation. One is based on the feature genes, the other on the reproduction genes. In the case of the polo shirt, the first one uses the first three genes of the genotype. (The first two are categorical genes and the third an integer-valued gene.) We define our function S as follows:

$$S(P_i, P_j) = \frac{1}{k} \cdot \sum_{k} S'(P_i^k, P_j^k)$$

where $P_i^k$ denotes the $k^{th}$ gene of an individual i in the population.

In the case of the categorical genes, G1 and G2, S' is given by:

$$S'(P_i^{1,2}, P_j^{1,2}) = \begin{cases} 1 & \text{iff } P_i^{1,2} = P_j^{1,2} \\ 0 & \text{otherwise} \end{cases}$$

In the case of gene 3, which is an integer gene, S' is computed as follows:

$$S'(P_i^3, P_j^3) = 1 - \frac{|P_i^3 - P_j^3|}{\text{Max}\Delta^3}$$

where $\text{Max}\Delta^3$ is the range of gene G3, that is, the difference between the maximum and minimum values it is allowed to take.

In the case of real-valued genes such as those used for the reproduction variables, redundancy or density is computed using the Euclidean distance $d_{ij}$ (described earlier) in R-space between the different population members, as follows. The redundancy or density of the $i^{th}$ population member is given by:

$$R(P_i) = \sum_{j} f(d_{ij})$$

where $d_{ij}$ is the distance in R-Space between individuals i and j, and $$f(x) = \max\left(1 - \frac{x}{\text{threshold} \cdot d_{\max}}, 0\right)$$

where threshold is a constant in the interval (0, 1] and $$d_{\max} = \max_{ij}(d_{ij})$$

Entropy

Population diversity is also measured by computing the Shannon entropy of the genotypic (or phenotypic) values in the population. A high entropy value suggests a high level of diversity. Entropy-based diversity measurement does not require a metric of similarity. We calculate the entropy of each gene independently and also combine the results using weighted averaging. To compute the entropy of a gene, we first count the frequency with which each possible allele value for that gene appears in the population. These frequencies are then plugged into the standard Shannon entropy equation:

$$H(G_k) = -\sum_{i} \frac{M_i}{N} \cdot \log_2\left(\frac{M_i}{N}\right)$$

where $H(G_k)$ is the entropy of gene $G_k$, $$\sum_{i}$$

is the sum over all the different values or alleles that $G_k$ can take, $M_i$ is the number of occurrences in the population of the $i^{th}$ allele for that gene, and N is the population size. This can be applied directly to genes G1 and G2. For genes that are similar to G1 and G2, but that span a range of many possible discrete (but ordered) values, we apply a coarse quantization to obtain a smaller set of discrete values. For genes such as gene G3 above, which span a continuous space, we convert the continuum into a set of symbols by quantizing the continuum to obtain a set of discrete bins and counting the $M_i$ occurrences of values that fall in each of these bins.

In another possible embodiment, we may compute entropy based upon higher-order effects that occur between genes. To do this, we calculate entropy based upon the frequency with which each possible n-tuple of allele values appears in the population across the n selected genes.

Entropy, being a population-wide measure is not used when a particular member of the population is sought, as in replacement or when populating a voting window. Rather, it is used to track the evolution process, and to adjust global parameters such as the mutation probability.

Clustering

In this section, we describe the subject of clustering, which relies on similarity measurements, and which is used at different times in the embodiment described here, as discussed later. If the function $S(P_i, P_j)$, described above, indicates the similarity between individuals $P_i$ and $P_j$, then we can define a new function $$D(P_i,P_j)=1-S(P_i,P_j)$$

to indicate the dissimilarity between these two individuals. With the function D, we can compute a dissimilarity matrix M, where each entry $M_{ij}$ is the dissimilarity between individuals $P_i$ and $P_j$. This matrix is symmetric and has zeros on the diagonal.

With the matrix M, we can apply any number of known clustering techniques to group the individuals either according to genotypic similarity or proximity in R-space, such as the K-medoid clustering algorithm. The K-medoid algorithm must be told the number of clusters to find. If the number of clusters that would best fit the data is not known, then the silhouette value of a clustering, can be used to decide how many clusters should be sought.

We may also cluster the human users based upon their voting behaviors. In this case, we measure the correlation in the voting records of any pair of users $V_i$ and $V_j$ and derive an entry $M_{ij}$ in matrix M, as follows:

$$M_{ij} = 1 - \frac{1 + \text{correlation}(V_i, V_j)}{2}$$

Strategies for Populating the Voting Window

The voting window, also referred to as the focus window, is the window presented to each voter for the purpose of displaying a set of design candidates and collecting that voter's assessment of them. The various policies used to populate the focus window at each voting iteration are described in this section. Generally speaking, these policies seek to achieve a number of sometimes conflicting goals: a) giving the participant an opportunity to explore as much of the design space as possible, and b) giving the participant a sense that the system is responsive to his or her votes.

Voting Window Mixture Policy

The voting or focus window mixture policy examines the votes that are submitted from a first focus window and determines the number of slots in the next focus window (for the participant whose votes the system is currently processing) that will be filled with: a) offspring of design candidates shown in said first focus window, and b) samples of design candidates from the general population of design candidates.

In the present implementation, all individuals in the focus window that receive a thumbs-up vote will parent at least one, but no more than two, offspring. If the number of thumbs-up votes is less than the number of focus window slots, then the individuals that have received a thumbs-up vote will be used to produce a second offspring until each has produced a second offspring, or until the slots of the new focus window are filled, whichever comes first. For example, if the focus window has six slots, and two individuals are given a thumbs-up, then both will parent two offspring, which will fill four of the six slots of the new focus window. If, instead, four individuals are given a thumbs-up, then the first two individuals will each parent two offspring, while the last two will each parent one, thus entirely filling the six slots of the focus window.

If, once all the thumbs-up votes are acted upon, any slots remain empty, then they are filled by sampling the general population of individuals, as described in the next section.

The policy described above is modified slightly when only one offspring is allowed for each candidate that receives a thumbs-up (see breeding section above.)

An alternative mixture policy used in the current implementation introduces the notion of elitism—well known in the Evolutionary Computation literature—into the focus window, such that some or all of the individuals that receive a thumbs-up are retained in the next focus window. Typically, elitism is used in generational versions of evolutionary algorithms in order to avoid the disappearance of highly fit members of the population across subsequent generations. In this case, we use a similar notion in the focus window or voter window. The motivation behind that policy is to provide a sense of continuity for the participant who might be uncomfortable with the disappearance from the focus window of previously preferred design candidates. When thumbs-up voting is used, as described in this example, if more entities received thumbs-up than there are elite slots in the next window, random picks are made among those entities that received thumbs-up, until the elite slots are filled.

Yet another alternative policy in the current embodiment fixes the minimum and maximum number of focus window slots that will be allocated for: a) elites (individuals that have received a thumbs up and that are carried over), b) offspring of those individuals that have received a thumbs up, and c) samples of the general population. If the number of thumbs-up votes exceeds the number of slots allocated for offspring, then a sampling method is invoked such that only some of the recipients of thumbs-up votes are able to parent an offspring. Alternatively, we can limit the number of thumbs-up votes that a user is allowed to make per focus window. Yet another alternative is to create offspring for every individual receiving a thumbs up, but not include all the offspring in the subsequent focus window (those not appearing in the focus window will still be in the general population).

Focus Window Sampling

For focus window slots that are available for samples from the population at large, a policy is needed to decide how these candidates are chosen. In the current implementation, the simplest policy used is one where we sample randomly, uniformly across the population of individuals. This sampling takes place after all offspring (parented by the individuals that received a thumbs up) have been inserted into the population. The sampling procedure does not attempt to prevent the same individual from appearing twice in the focus window, nor does it attempt to prevent two distinct individuals that are genotypically identical from appearing together in the focus window.

An alternative approach is to bias the sampling away from regions of high redundancy (redundancy being computed as described in a previous section.) The advantage of these policies is to allow for greater exploration of the design space by the participants, by affording greater diversity in their focus windows. One such policy, used in this embodiment, utilizes R-space redundancy to discount how likely a particular population member is to be selected. More specifically, roulette wheel selection is used, with the slice given to each of the N members of the population being inversely proportional to the redundancy of that member:

$$Pr(P_i) = \frac{\frac{1}{N \cdot R(P_i)}}{\sum_j \frac{1}{N \cdot R(P_i)}}$$

Another policy uses feature space redundancy (calculated on the basis of the feature genes) to bias the sampling, again using the same formula as above.

An alternative policy embodied in the present system performs a cluster analysis (described above) of the individuals in the population, either with respect to their positions in R-space, their genotypic characteristics, or both. Once the clusters are determined, the random sampling is conducted such that each cluster is equally likely to provide an individual for the open focus window slots, regardless of the number of individuals in each cluster. The advantage of this scheme is to allow the participant to sample equally from the different species or preference clusters (or aesthetic clusters) that are emerging during the exercise (speciation is discussed later.) This is in contrast to uniform sampling where, in effect, we sample from every cluster in proportion to the cluster size. A related approach is one where we select the representative design candidate for each cluster (the centroid or medoid of that cluster.)

In yet another policy, we bias the sampling in favor of individuals that have been infrequently viewed by that participant. In this case, the probability of a member of the population being selected is inversely related to the number of times it has appeared in his or her focus window. The probabilities used to load the roulette wheel are given by:

$$Pr(P_i) = \frac{\frac{1}{f(m_{ij})}}{\sum_j \frac{1}{f(m_{ij})}}$$

where $m_{ij}$ is the number of times that design candidate $P_i$ has appeared in the focus window of participant j, and $f(x)$ is a monotonic function. For example:

$$f(m_{ij}) = m_{ij}^2$$

In a related policy, we bias the selection in favor of individuals with feature properties that have been infrequently viewed (based on feature similarity), or in favor of individuals in regions of R-space that have been infrequently viewed in the focus window. Here too, the probabilities used to load the roulette wheel for selection are given by:

$$Pr(P_i \mid W^t) = \frac{\frac{1}{R(P_i \mid W^t)}}{\sum_j \frac{1}{R(P_i \mid W^t)}}$$

where $R(P_i \mid W^t)$, the redundancy of population member $P_i$ with respect to the $t^{th}$ focus window $W^t$ ($W^1$ being the current window, $W^2$ the previous window, etc.) of the given participant is given by:

$$R(P_i \mid W^t) = \sum_q S(P_i, W_q^t)$$

where $$\sum_q$$

is the summation over all q members or design candidates in the focus window, and $S(P_i, W_q^t)$ is the similarity between entity $P_i$ and the $q^{th}$ member of focus window $W^t$. Finally, S, the similarity function, is computed using any of the methods given in the previous section on redundancy and similarity, as appropriate.

A variation on this policy is one where we track not only the last focus window, but the last few or n focus windows and where we either give all of them equal weight or give the content of the more recent focus windows greater importance in the redundancy calculations. One particular version of this looks at the last n focus windows (n=3, e.g.), and weights them differentially. The slices or shares used in the roulette wheel in this case are given by:

$$Q(P_i) \sum_{t=1}^n \omega_t \cdot \left( \frac{\frac{1}{R(P_i \mid W^t)}}{\sum_j \frac{1}{R(P_i \mid W^t)}} \right)$$

with the weighting factors $\omega_t$ decreasing with $$\omega_t = \frac{1}{t}$$

as an example.

In yet another sampling policy, used with in this implementation, we bias the sample away from individuals that are redundant (either based on feature space similarity or on reproduction space similarity, or both) with respect to individuals that have been given a thumbs-down vote by the participant whose focus window is being populated. This is intended to minimize the chances of subjecting that participant to design candidates that he or she already voted down. This is done in a manner similar to the ones described in the previous policy, except in this case, the redundancy used is not $R(P_i \mid W^t)$ but $R(P_i \mid W^{down,t})$, which is computed only with respect to those focus window members that received a negative vote from the participant in question. A related policy is one where we bias the sample towards individuals that are redundant (either in feature space, reproduction space, or both) with respect to individuals that have been given a thumbs-up vote (alternatively, a neutral vote) by the user whose focus window is being populated. In that case, $R(P_i \mid W^{up,t})$ is used, the probabilities or shares used in the roulette wheel are directly proportional to redundancy, as opposed to inversely proportional; for example:

$$Pr(P_i \mid W^t) = \frac{R(P_i \mid W^t)}{\sum_i R(P_i \mid W^t)}$$

Yet another policy attempts to maximize the diversity in the focus window with respect to the genetic content of design candidates (either based on feature genes, reproduction genes, or both) with each subsequent sample being biased away from the properties of the individuals placed into the focus window up to that moment. The rationale is to increase diversity in the participant's focus window.

Any of the policies mentioned above, or variations thereof, can be employed to populate a participant's window when that participant returns after being away from an ongoing exercise for a while. Another policy used specifically for that purpose involves reloading a returning participant's window with the same candidates that were present in his or her last focus window when they last logged off. This policy is often problematic however, as these candidates are likely to have been removed from the population, necessitating that they be recreated and re-inserted in the population. An alternative is to present the participant with as broad a sampling of the current design population as possible. This is done by sampling from cluster representatives as described earlier. This policy is also used in the case of a participant who joins the exercise after it has been ongoing for some time, and who is not identified with any particular preference segment.

Figure 7C:
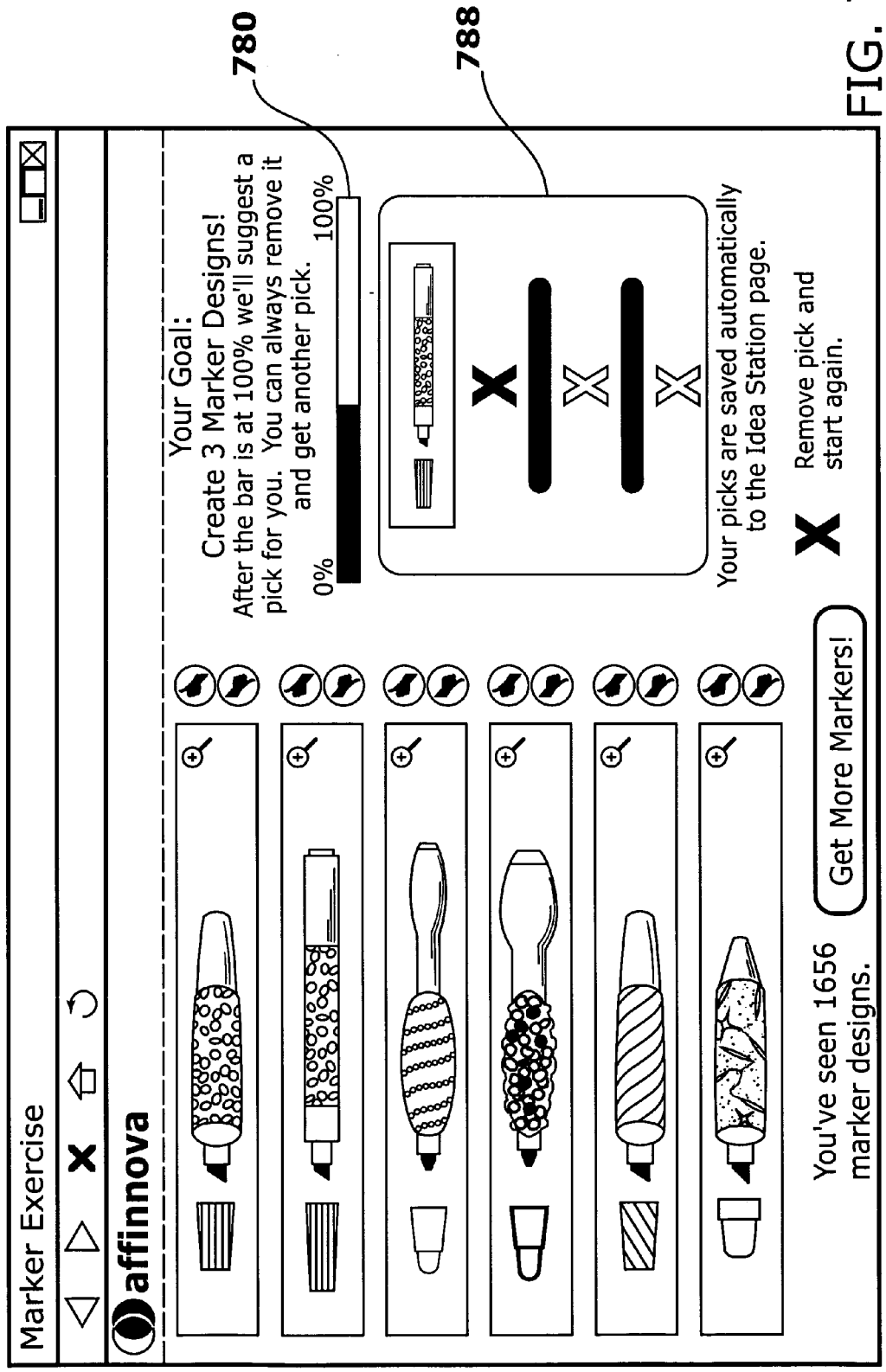
FIG. 7C is a screenshot showing an embodiment of a voting screen featuring a "pick panel" and a "progress bar."
Figure 8:
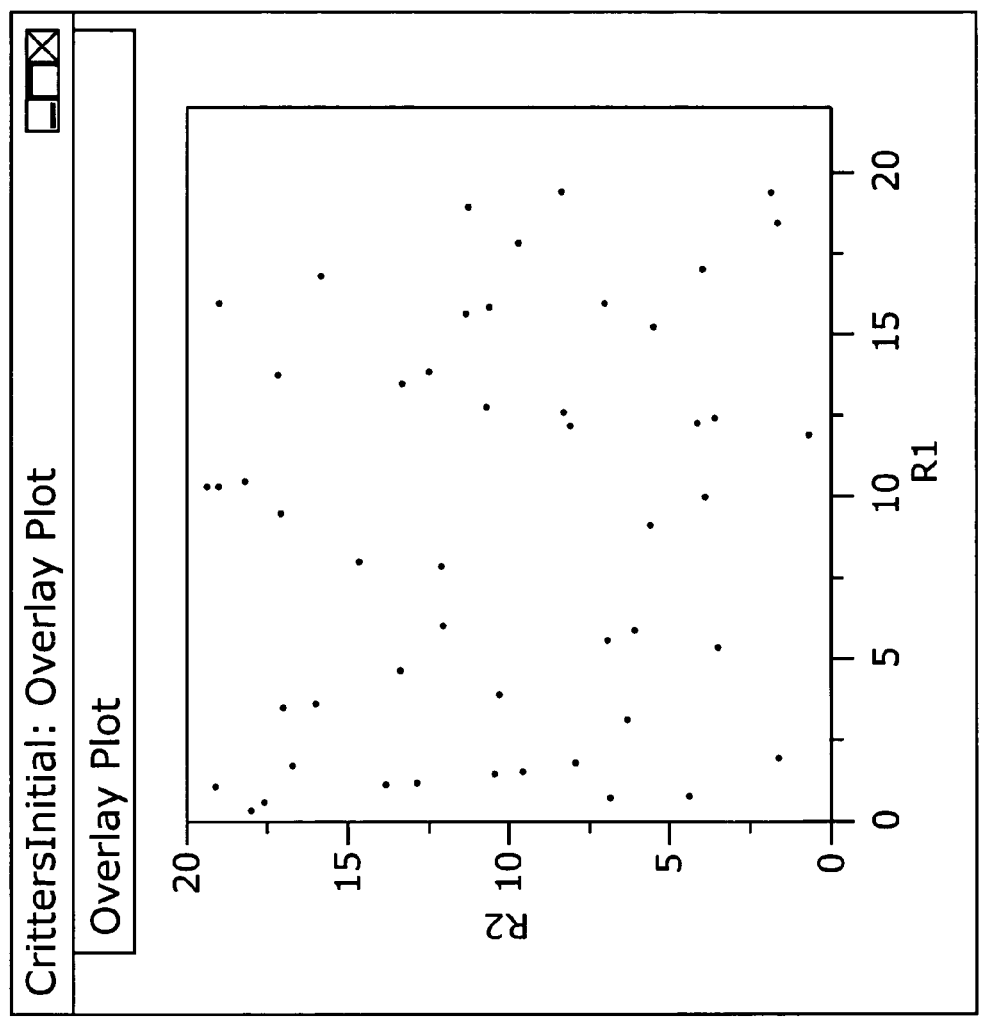
FIG. 8 is a screenshot depicting an embodiment of a display of items based on their R-space representation.
Figure 9:
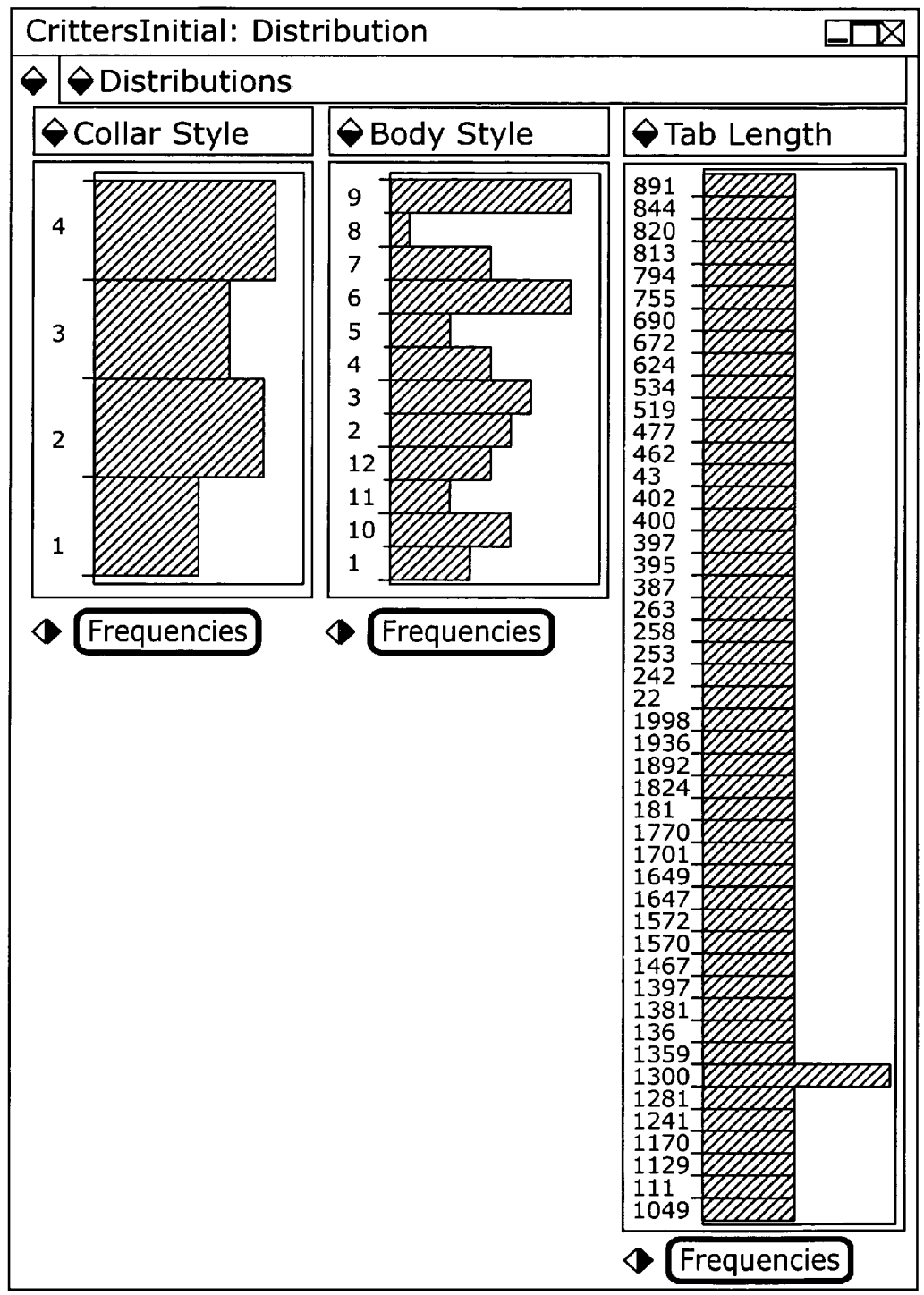
FIG. 9 is a screenshot depicting an embodiment of a display of items based on their feature representation.

In one embodiment certain refinements are added to the voting window, which are intended to provide the participant with some or all of the following: a) a measure or indication of progress during the exercise; b) a sense of accomplishment as goal posts are reached during the exercise; c) more direct control over the evolution process; d) a sense of membership in a community of co-participants in the design process. FIG. 7C shows a voting window with two of these refinements on the right hand side. These include a progress bar 780 that covers a range from 0% to 100%, and that indicates the level of progress with a colored section. The other refinement shown in the same figure is the "pick panel" 788, which is the panel on the right hand side of the voting window, under the progress bar, labeled "Marker Designs". In the figure, the picks panel shows three thumbnails arranged vertically, one of them with a selection in it, and the other two still blank. The picks panel displays particular design candidates at certain points during the exercise, based on one of the strategies described below. In the case shown, an "X" mark under the selected pick allows the participant to remove said pick and to restart that part of the exercise that resulted in that particular pick.

Four classes of strategies may be used in this embodiment. The first class of strategies relies on a fixed number of votes submitted by the participant; a second class depends on the degree of similarity among the candidates that are showing up in the participant's last few voting windows, and therefore may involve a variable number of voting submittals by the participant in question. A third class allows the participant to directly select one of the design candidates in the voting windows a pick, by using a special button next to the thumbs-up and thumbs-down button (not shown in this figure.) Finally, a fourth class of strategies are intended to use the pick panel to show the participant how other participants are voting.

Strategy I: Analyze a Preset Number of Votes and Pick

In this strategy, the system is set to allow each participant to view and assess a preset number n of voting windows, with typical values of n ranging between 6 and 40. In this case, the progress bar increases in proportion to the ratio of voting windows viewed by the participant up to that point, to the preset number n. After the n vote submittals, a pick is automatically made on behalf of the participant based on his voting patterns, as described below, and the progress bar is reset to zero, a new voting window populated at random from the population of designs at large, and a new set of n vote submittals is started. The voting window shown in FIG. 7C corresponds to a case where the participant is asked to go through three sets of n vote submittals, resulting in three picks.

After the preset number n of voting windows, an analysis is performed on that participant's votes on these n windows (all the votes may be examined or only the last 80% of the n submittals may be examined to remove any "training" or accommodation effects.) In one scheme, the analysis involves counting the thumbs-up votes received by each allele, and using the counts to generate the most "selected" combination of attributes values. At that point, a design candidate is assembled using these most selected attribute values, and it becomes the pick. This approach works well when there are few or no dependencies between genes. A more refined analysis that works well even if there are dependencies involves the following steps: After the n vote submittals have been received, all candidates in these voting windows that have received a positive vote (thumbs-up) are collected. Then, a first positive-vote-candidate is selected, and, starting with the first gene of that candidate, a count of how many of the other positive-vote-candidates share the same allele for that gene is performed. This is repeated for all the genes of the selected candidates, and these k counts (k being the number of genes) are added up; this count is the "representativeness" score for that candidate. This process is repeated for every one of the positive-vote-candidates, and these are ranked on the basis of their score. Of those, the top-ranking positive-vote-candidate is selected as a pick.

In one variation, the participant is given a chance to reject the chosen pick, in which case the next highest scoring one is selected as a pick, and so on. If several (for example, three) are rejected, that set of n iterations is restarted. In another variation, the participant is presented with a panel showing the three highest scoring pick candidates, and he is given the opportunity of choosing the one he deems closest to what he had been voting for.

Strategy II: Focus Window Convergence Pick

In the second class of progress indication strategies, the progress bar does not increase monotonically, but it might regress depending on the behavior of the participant. If a voter votes consistently, then it is more likely that his successive voting windows will be populated with increasingly similar design candidates; in that case, a progress bar tied to the similarity of the contents of these successive voting windows will increase. In this case, the number of vote submittals prior to a pick selection is variable. As some fraction (say, ¾) of the design candidates in the voting window became identical or very similar, the most duplicated candidate is chosen as a pick. Having made the pick, and if the pick is not rejected by the participant, a new focus window is populated (e.g., at random), and the participant starts the next phase of the process that will yield the next pick. If the pick is rejected, alternatives similar to the ones presented above under Strategy I are followed.

Strategy III: Direct Selection

In this case, after a certain number of voting submittals have been made by the participant, an additional button is enabled next to each of the design candidates in the focus window. That button is a direct pick button, which allows the participant to select the corresponding candidate to become a pick. Alternatively, when direct picks are enabled, the participant is allowed to drag the desired candidate from its location in the voting window onto the picks panel area, which will place a copy of it there. Once the participant makes a direct pick, the direct pick buttons are again disabled for a preset number of voting iterations. The pick panel has a fixed number of slots to hold the picks, and when a new pick is inserted by clicking its direct pick button, it gets placed at the top of the Pick Panel, while everything else moves down one slot, the design occupying the bottom slot being discarded. If the pick is made by dragging it onto the pick panel, then the picked design either replaces the item in the slot onto which it is dragged and dropped, or the items at that slot and below are shifted down one slot (item in bottom slot again discarded). No matter how the pick panel is managed, the history of all picks is recorded for subsequent analysis.

A variation on this scheme also allows the participant to reinsert one or more of the picks in the pick panel back into the population of design candidates (and therefore in his focus of voting window as well) later in the exercise, if the participant gets the impression that that design candidate may have been lost. In that case, the R-space values of that candidate are updated to reflect the changes that may have taken place in R-space in the interim. One cannot rely on that candidate's previous R-space coordinates to be compatible with the current configuration of R-space, since R-space is constantly in flux. A new R-space location can be chosen in one of the following ways:

1) A region of R-space that contains the designs that are most similar to the design we wish to re-insert is located, based on feature gene similarity; the re-inserted design is given new R-space coordinates that place it in that neighborhood. If no designs in the population are sufficiently similar to the design to be reinserted then:
   a) Pick R-space coordinates at random, but within the bounding box of the current population (optionally expanded by some amount);
   b) Place the re-inserted individual in the least dense region of R-space.
   c) Place the re-inserted individual at the periphery of the populated regions of R-space at a distance from the periphery determined by the average distance between cluster representatives.

Strategy IV: Social Network Effect Schemes

This is a family of strategies that involve showing the participant, in a pick window, not only the pick candidates estimated based on his voting patterns, but also the picks (candidates or actual) for other voters. In this case, the most popular design candidate across voters is estimated using the same techniques described under Strategy I above, except that the positive-vote-candidates are collected from all participants, not only from the participant whose voting window we are discussing.

Speciation and Dynamic (or Co-Evolutionary) Segmentation

When the $\beta$ parameter used to control mate selection (Eq. (3)) is set to a high enough value, such as 40.0, then the mechanisms and procedures outlined above will automatically allow different preference profiles to emerge and to coexist during the process. (In case Eq. (5) is used instead, then the $\gamma$ parameter needs to be small enough.) To the extent that the participants represent a population of consumers in a market, and to the extent that different subgroups in that market end up evolving preferences for distinct combinations of product attributes, then the system in effect performs a sort of dynamic segmentation of that market. The term "dynamic" is used here to indicate that the preference profiles and the corresponding preferred designs are co-evolved during the process. This is different from existing approaches to market segmentation, which either assume given preference profiles (for which appropriate design are developed), or given designs for which the appropriate customers are identified. This section is intended to explain how the current implementation affords that segmentation capability, and to present a simple example.

Assortative Mating

To the extent that crossover operations between certain individuals (design candidates) results in new candidates that are less preferred by the participants, we seek to prevent such mating from occurring. However, we do not know a priori which such matings will be deleterious. The R-space mechanisms that express individuals' mate choices can learn, over time, which mate pairs are compatible and which are not, based upon the assessment by participants of the outcomes of actual matings. Pairings of genetic material that are successful will gradually tend to occur more frequently and, thereby, crowd-out those pairings that are less successful. The prohibition (or reduced likelihood) of certain mate pairs is known as assortative mating, and each set of individuals that are allowed to mate with each other, but not with members of another set, is known as a species.

The evolution of species (speciation) is of direct importance to dynamic participant preference segmentation. When a design exercise begins, the R-space is homogenous: the R values of the population of design candidates are distributed uniformly in R-space. As evolution proceeds, information is gained (through the participants' feedback) about which pairings of genetic material are more successful than others. As a result of participants' assessments and the crossover operations on the reproduction genes, the distribution of the gene values in R-space becomes heterogeneous. In other words, the R-space begins to cluster. This heterogeneity is structured in a way that keeps certain individuals near each other and far from others. These clusters correspond to species, that is, sets of individuals that are reproductively isolated. As reproductive isolation emerges, each species, along with the participants who have evolved it through their voting, become specialized to a particular sub-region of the design space, and they are less subject to interference from other species.

Multiple Niches in an Ecology

When a market has multiple segments, there exists a set of distinct preference profiles for each of these segments. Each segment's preference represents an area in the design search space. These areas can be thought of as distinct ecological niches. The assortative mating dynamic allows multiple species to emerge and persist, where each species inhabits its own niche. The number of participants supporting each segment—a proxy for the size of that market segment—determines the carrying capacity of that niche, and thus the size of the corresponding species. In other words, as R-space clusters form, the size of a cluster (the number of design candidates that belong to that particular species) reflects the size of the market segment (assuming a balanced level of voting among participants, which can be controlled in the current implementation, either by limiting the number of voting screens presented to each participant, or by disregarding the votes submitted by a given participant that participant has reached his or her allotted number of votes.) Because the participants discover design possibilities as they interact with the system (and thereby form opinions), and the designs evolve in response to the participants, one can describe the interaction between designs and participants to be in some sense co-evolutionary. The preferences evoked by the evolving designs allow the system as a whole to converge on a set of designs that delineate multiple segments in the market.

Figure 10:
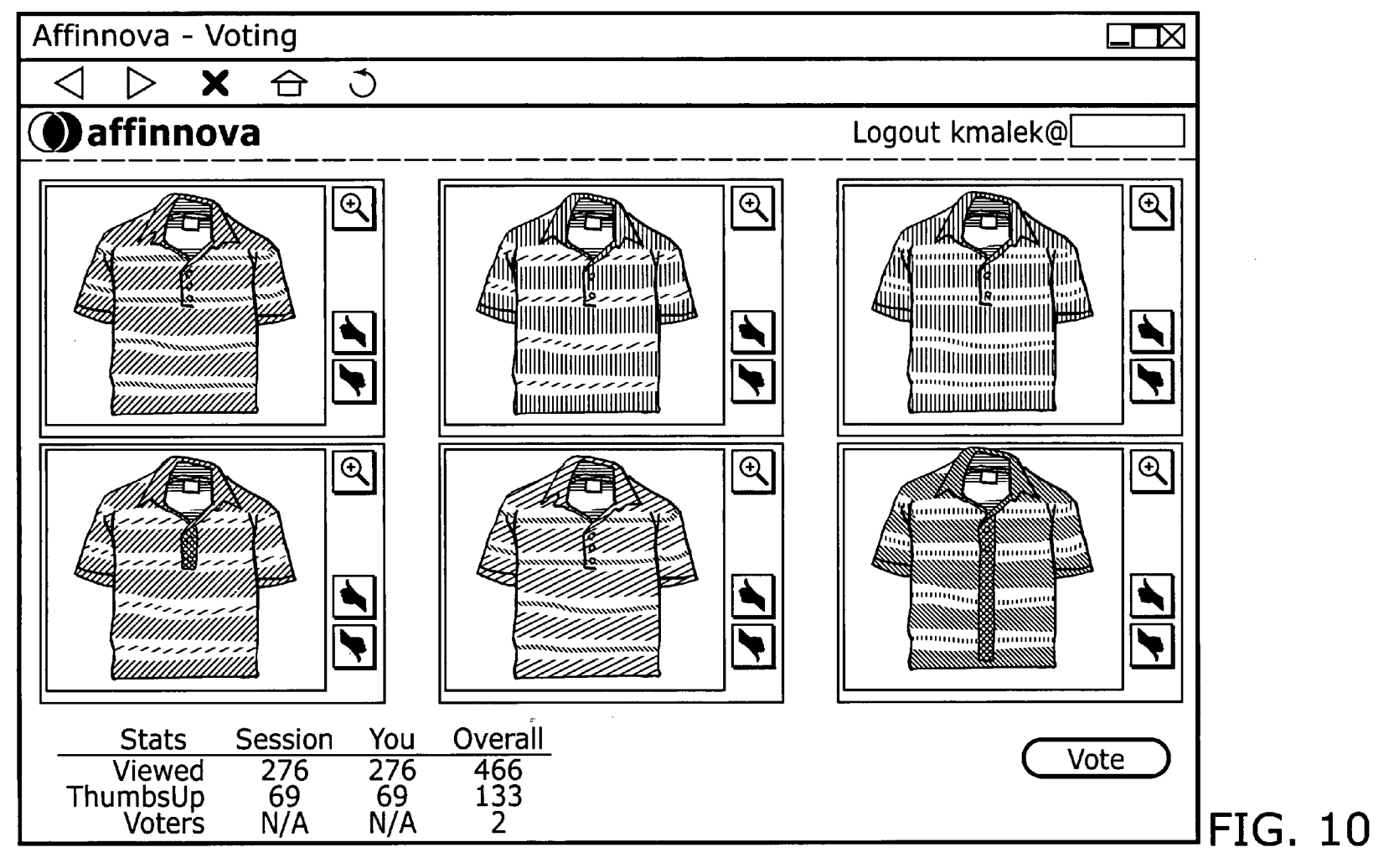
Figure 11:
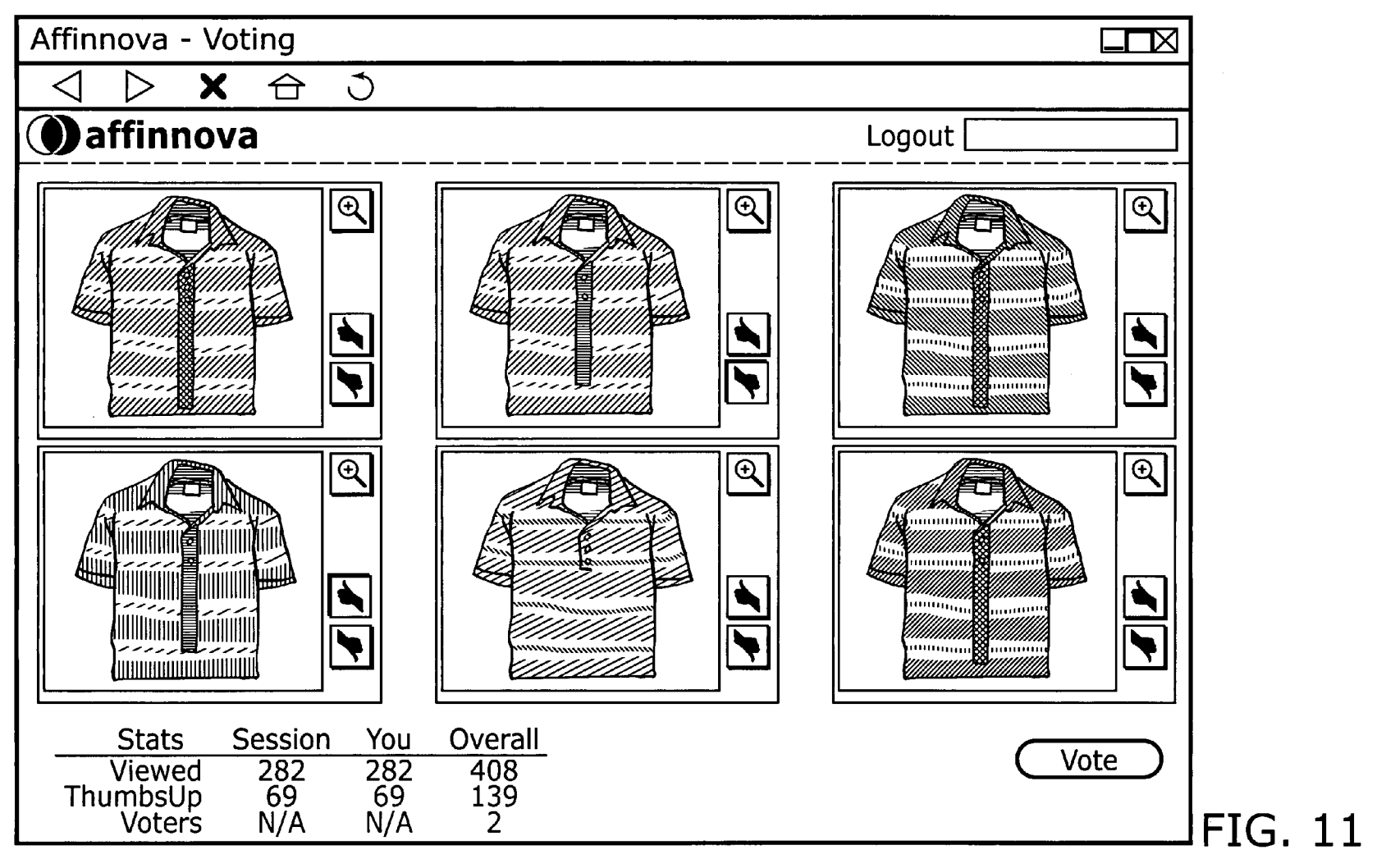
Figure 12:
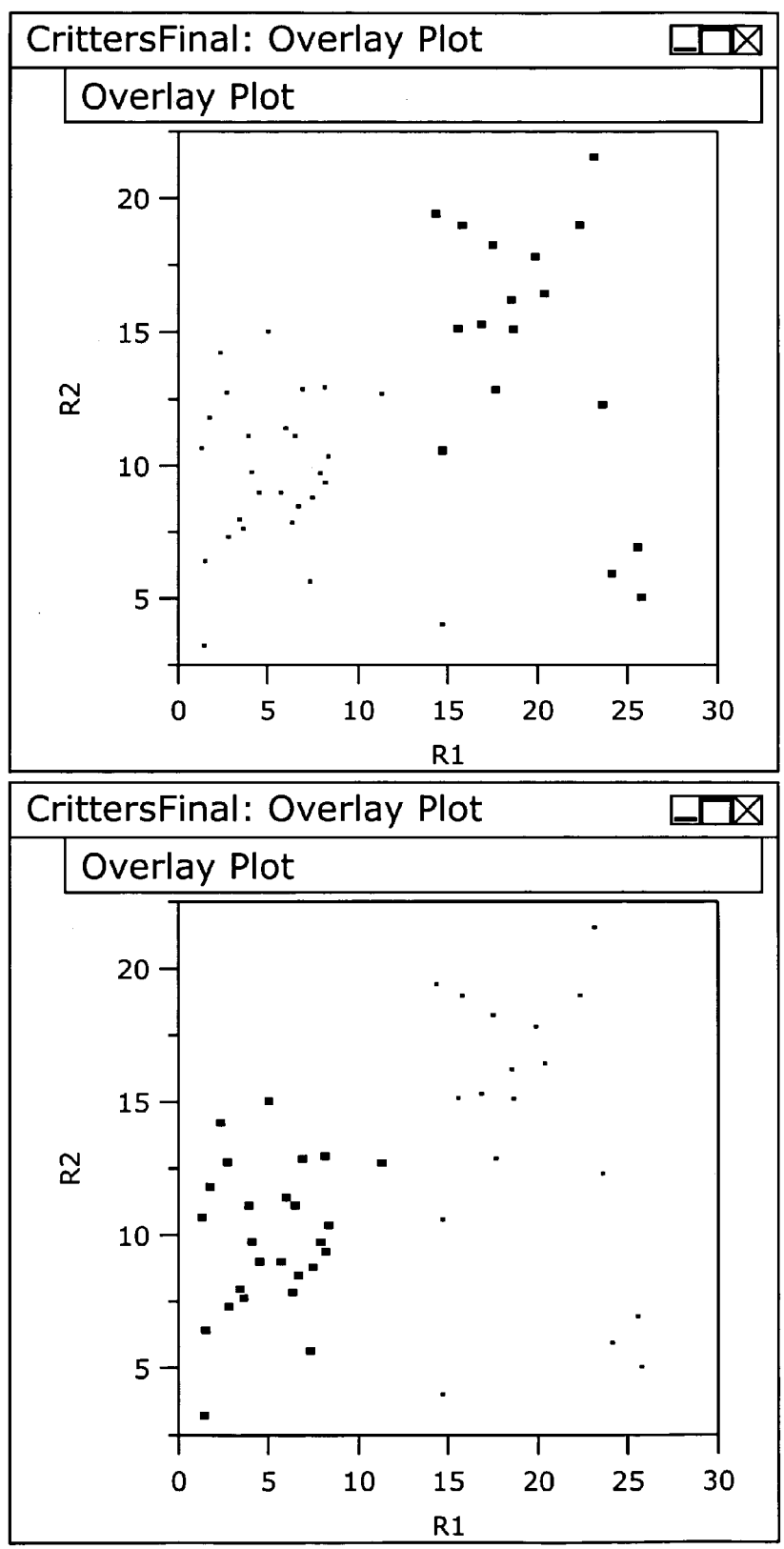
FIG. 12 is a screenshot depicting one embodiment of an R-space plot.
Figure 13:
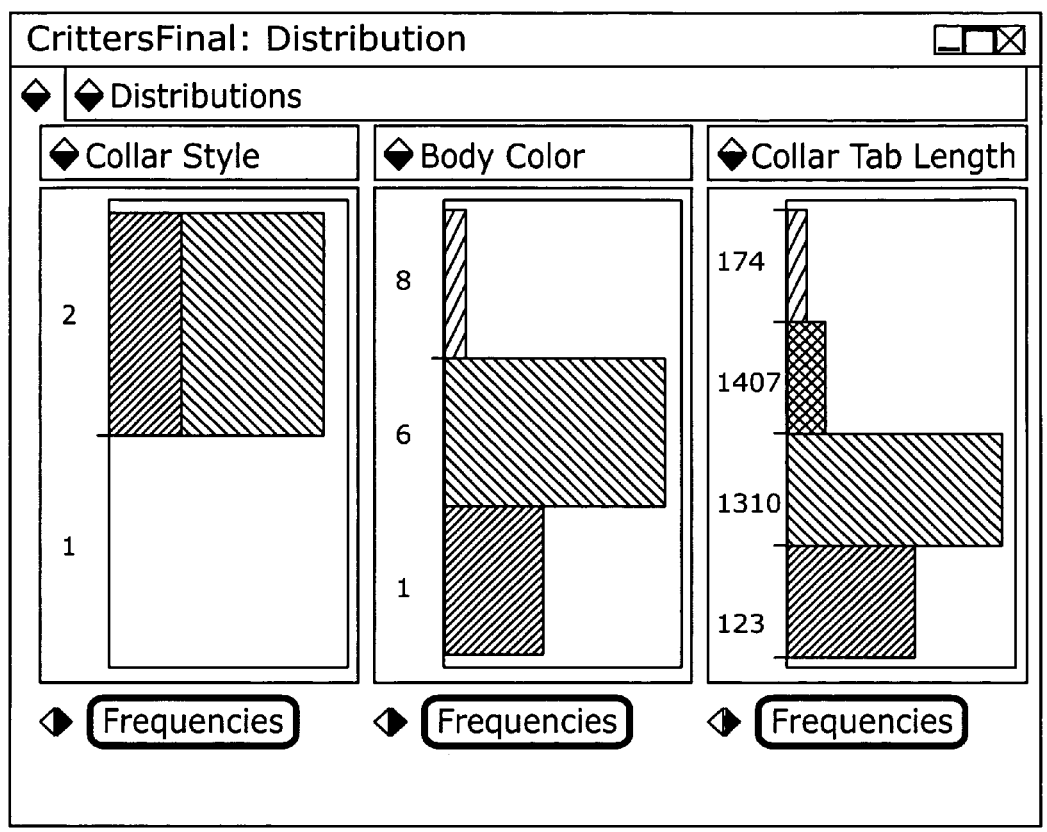
FIGS. 13 and 14 are screenshots depicting the distribution of feature genes in one embodiment of a design exercise.
Figure 14:
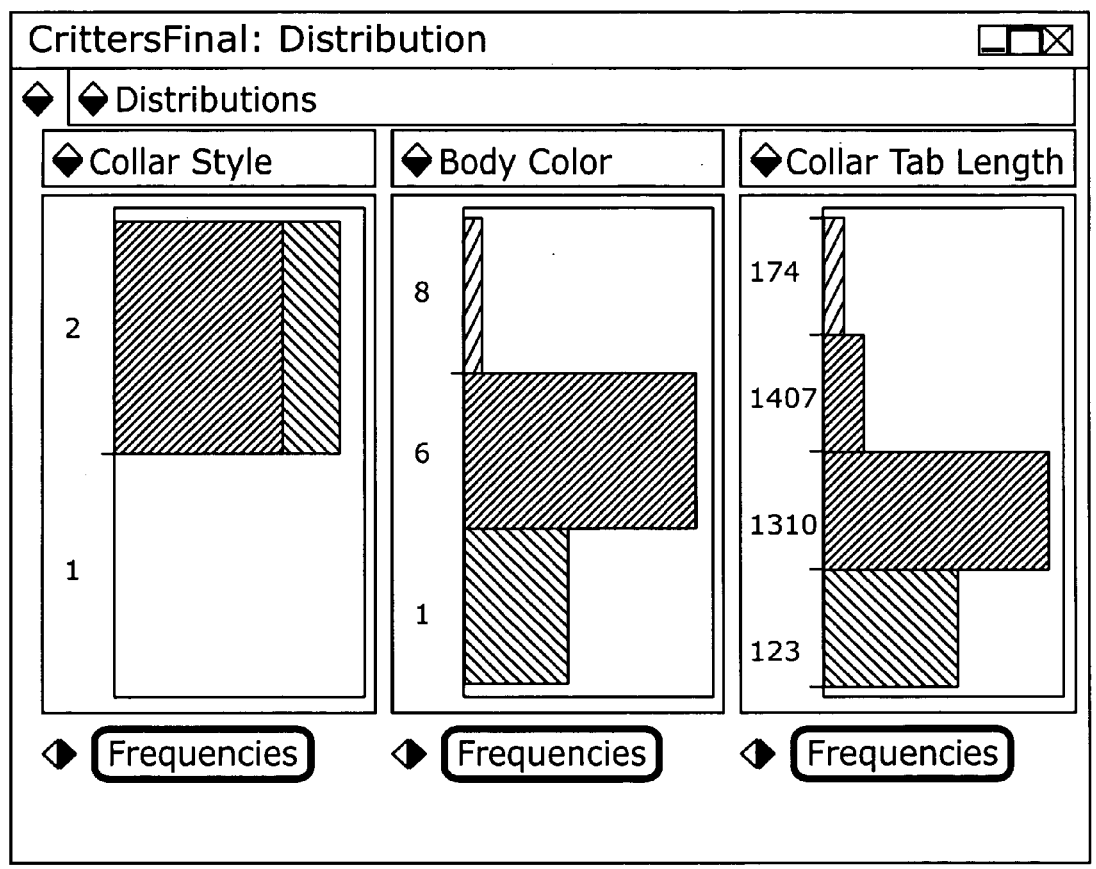

FIGS. 8 through 14 present an example of this dynamic segmentation process. In this example, two participants interacted with the system concurrently. The process starts with uniformly distributed reproduction genes and feature genes (see FIGS. 8 and 9, respectively) based on a random seeding of the population of candidates. After a number of voting cycles, two segments emerge, one corresponding to participant 1, and the other to participant 2. FIGS. 10 and 11 show the focus windows for the two participants at that point in the exercise. The content of each focus window is dominated by the design of choice for that participant, that is, the design choices shown to the first participant may feature different colors, patterns, and design styles (e.g. tab length) than the design choice presented to the second participant. The design choices shown to either particpant may be highly concentrated in R-space, that is, each design choice may be very similar to each other design choice shown to that particpant (e.g. similar colors, similar patterns, etc.). In other exercises the design choices presented to participants may be scattered in R-space, that is, each design choice may have a different color or pattern from other design choices being presented to the particpant. FIG. 12 shows the R-space plot at that point, with the design candidates corresponding to the two segments highlighted; in this embodiment, the two clusters are clearly distinguished. Finally, FIGS. 13 and 14 show the distribution of feature gene values for each participant at that point in the process. FIGS. 13 depicts the distribution of feature genes 1 though 3 for participant 1. Style "2" is the only surviving collar style, since it is preferred by both segments. Participant 1 prefers a purplish body style (body style "1") and a short tab length (value equal to 123).

FIG. 14 depicts a distribution of feature genes for participant 2. Collar style "2" (tab collar) is the only surviving collar style. Participant 2 prefers a green body style (body style "6") and a long tab length (value equal to 1310).

In one embodiment, the demographic information collected about each user may be used to alter the evolutionary algorithm described above. For example, a system may accept input from a wide universe of users but only use input from a set of users having a particular demographic for the purposes of evolving the universe of design objects. This embodiment allows the manufacturer to determine the preferences of a particular market segment without requiring the manufacturer to affirmatively direct a market research effort at a particular demographic market.

In another embodiment, the system described above may be used to permit data to be gathered concerning competitive products. This is accomplished by including competitive products in the set of products designed to see if they "survive." In one particular embodiment, the evolutionary algorithm recognizes when a competitive product is genetically similar to a set of product designs selected by one or more selectors and inserts the competitive design into the next generation of product choices.

In still another embodiment, the systems described above are used as a "virtual sales person," that guide a consumer in determining one or more products for purchase. In this embodiment, the product designs represent the universe of items for sale by a company and successive generations of products are selected from the universe based on received user input.

In still another embodiment, the evolutionary design system includes information from commercial actors that supply raw materials to the manufacturer. For example, a supplier may provide information concerning handles available for inclusion in a product. The information typically will include dimension information and style information, but may also include pricing information. In this embodiment, a selector may be provided with information regarding the cost of a potential design and that genetic factor may be considered in creating the next generation of products for review by the selector.

In yet another embodiment, the evolutionary design techniques described above are enhanced by providing to selectors simulated endorsement data or other promotional schemes and strategies. In this embodiment, selectors that are perceived as opinion makers may have their voting preferences displayed to the voting public to determine if other selectors change their votes based on the knowledge of the opinion-makers voting preferences.

Many alterations and modifications may be made by those having ordinary skill in the art without departing from the spirit and scope of the invention. Therefore, it must be expressly understood that the illustrated embodiment has been shown only for the purposes of example and should not be taken as limiting the invention, which is defined by the following claims. The following claims are thus to be read as not only literally including what is set forth by the claims but also to include all equivalent elements for performing substantially the same function in substantially the same way to obtain substantially the same result, even though not identical in other respects to what is shown and described in the above illustrations.

What is claimed is:

1. A method of determining the relative affinity of one or more consumers from a group of consumers for a form of a product, comprising:
   a) presenting, over a computer network and to the group of consumers, a group of product forms, each of the product forms including a particular combination of attributes;
   b) enabling members of the group of consumers to express a preference for a subset of the presented product forms;
   c) capturing data indicative of the preferences expressed by members of the group of consumers;
   d) inputting at least some of the captured data into a computer program to provide a derived group of product forms, at least one of the derived group of product forms including a new attribute or a new combination of attributes;
   e) presenting, to the at least some of the group of consumers, the derived group of product forms; and
   f) repeating steps b) through e) to collect data indicative of the relative affinity of one or more consumers from the at least some of the group of consumers for a form of the product, wherein the product comprises a mass produced good, a consumer good, a manufactured good, a service, advertising material, or packaging material.

2. The method of claim 1 wherein step d) includes generating a variety of product forms in the derived group of product forms to promote exploration of consumer preferences for product forms including various combinations of attributes.

3. The method of claim 1 wherein step d) includes generating the derived group of product forms to promote convergence to product forms that include attributes that match the preference of one of the consumers of the group of consumers.

4. The method of claim 1 wherein step d) includes generating the derived group of product forms to promote convergence to product forms that include attributes that match the preferences of more than one of the consumers of the group of consumers.

5. The method of claim 1 wherein step d) includes generating the derived group of product forms using a genetic or evolutionary computation technique.

6. The method of claim 1 wherein step d) includes the use of conjoint analysis.

7. The method of claim 1 wherein each of the attributes comprises a structural, functional, stylistic, or economic feature of the product.

8. The method of claim 1 wherein the product comprises apparel, footwear, a computer, a telephone, a chair, a seat, an automobile, a bicycle, a home, a building, a boat hull, or a billboard.

9. The method of claim 1 further comprising collecting demographic information from the group of consumers.

10. An automated method of identifying member candidates for a group of persons having a shared affinity, comprising:
  a) presenting, over a computer network, a set of alternatives to a group of participants, each of the alternatives having a particular combination of attributes;
  b) enabling the participants or a subset thereof to express a preference for a subset of the presented alternatives;
  c) capturing data indicative of the preferences expressed by the participants or the subset thereof;
  d) inputting data into a computer program to provide a derived set of alternatives including alternatives having a new attribute or a new combination of attributes, the derived set of alternatives being influenced by the captured data;
  e) presenting to the participants or a subset thereof at least a portion of the derived alternatives; and
  f) repeating steps b) through e) until one or more groups of persons having a shared affinity for one or more of the derived alternatives are identified, wherein each of the attributes comprises a structural, functional, stylistic, or economic feature of one of the alternatives.

11. A method of identifying one or more subgroups of people from a larger group of people, comprising:
  a) presenting, over a computer network and to at least some of the larger group of people, a plurality of forms of a product;
  b) obtaining, from each of at least some of the at least some of the larger group, information about that person's preference for one or some of the plurality of presented product forms;
  c) providing a plurality of derived forms of the product, based at least in part on at least some of the obtained information; and
  d) repeating steps a), b), and c), using the plurality of derived product forms from step c), until one or more subgroups of people are identifiable, each of the one or more identifiable subgroups preferring at least one product form that is different than at least one product form preferred by the other subgroups, wherein the product comprises a mass produced good, a consumer good, a manufactured good, a service, advertising material, or packaging material.

12. The method of claim 11 wherein each of the plurality of presented product forms includes a particular combination of attributes, and wherein at least one of the plurality of derived product forms includes a particular combination of attributes that is different than the particular combination of attributes for at least one of the plurality of presented product forms.

13. The method of claim 12 wherein each of the attributes comprises a structural, functional, stylistic, or economic feature of the product.

14. The method of claim 11 wherein step b) includes obtaining the information over the computer network.

15. The method of claim 11 wherein step c) includes the use of a computer program to provide the plurality of derived product forms.

16. The method of claim 11 wherein step c) includes the use of an evolutionary algorithm to generate the plurality of derived product forms.

17. The method of claim 11 wherein step c) includes the use of a genetic algorithm to generate the plurality of derived product forms.

18. The method of claim 11 wherein step c) includes selecting the plurality of derived product forms.

19. The method of claim 11 wherein the product comprises apparel, footwear, a computer, a telephone, a chair, a seat, an automobile, a bicycle, a home, a building, a boat hull, or a billboard.

20. The method of claim 11 further comprising collecting demographic information from people.

21. A plurality of client computers for use in identifying member candidates for a group of persons having a shared affinity, each of at least some of the client computers configured to:
  a) receive for presentation, to a participant from a group of participants, a set of alternatives, each of the alternatives having a particular combination of attributes;
  b) enable the participant to express a preference for a subset of the presented alternatives;
  c) capture data indicative of the preference expressed by the participant;
  d) provide data to at least one remote server which provides back a derived set of alternatives including alternatives having a new attribute or a new combination of attributes, the derived set of alternatives being influenced by the captured data;
  e) receive for presentation to the participant at least a portion of the derived alternatives; and
  f) repeat functions b) through e) until one or more groups of persons having a shared affinity for one or more of the derived alternatives are identified by the remote server, wherein each of the attributes comprises a structural, functional, stylistic, or economic feature of one of the alternatives.

* * * * *